US010895785B2

United States Patent
Higashiyama et al.

(10) Patent No.: US 10,895,785 B2
(45) Date of Patent: Jan. 19, 2021

(54) LIQUID CRYSTAL DISPLAY PANEL, LIQUID CRYSTAL DISPLAY PANEL BODY COMPONENT, AND METHOD OF PRODUCING LIQUID CRYSTAL DISPLAY PANELS

(71) Applicant: SHARP KABUSHIKi KAISHA, Sakai (JP)

(72) Inventors: Miyuki Higashiyama, Sakai (JP); Makoto Nishiuchi, Sakai (JP); Kohshiroh Taniike, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/669,928

(22) Filed: Oct. 31, 2019

(65) Prior Publication Data

US 2020/0064674 A1    Feb. 27, 2020

Related U.S. Application Data

(63) Continuation-in-part of application No. 16/452,956, filed on Jun. 26, 2019.

(60) Provisional application No. 62/692,449, filed on Jun. 29, 2018.

(51) Int. Cl.
*G02F 1/1339*    (2006.01)
*G02F 1/135*    (2006.01)

(52) U.S. Cl.
CPC .......... *G02F 1/13392* (2013.01); *G02F 1/135* (2013.01); *G02F 2001/1351* (2013.01)

(58) Field of Classification Search
CPC ............. G02F 1/1339; G02F 1/133512; G02F 1/133514
See application file for complete search history.

(56) References Cited

U.S. PATENT DOCUMENTS

| 7,298,449 B2 * | 11/2007 | Tatemura .......... G02F 1/133371 349/153 |
| 7,903,192 B2 * | 3/2011 | Azuma ............. G02F 1/133351 349/149 |
| 2005/0117106 A1 | 6/2005 | Tatemura et al. |
| 2007/0177092 A1 * | 8/2007 | Hosoya ............. G02F 1/133305 349/149 |

(Continued)

FOREIGN PATENT DOCUMENTS

| JP | 2003-107498 A | 4/2003 |
| JP | 2005-107165 A | 4/2005 |

(Continued)

*Primary Examiner* — Dung T Nguyen
(74) *Attorney, Agent, or Firm* — ScienBiziP, P.C.

(57) ABSTRACT

A liquid crystal display panel includes a first substrate, a second substrate, a liquid crystal layer, and a main sealing portion. The second substrate opposes the first substrate. The liquid crystal layer is disposed between the first substrate and the second substrate. The main sealing portion is disposed in a circular shape to surround the liquid crystal layer and assembles the first substrate and the second substrate together to seal the liquid crystal layer between the substrates. A distance between opposing surfaces of the first substrate and the second substrate in a main attachment region of the substrates where the main sealing portion is disposed is smaller at an innermost peripheral portion than at the other portions.

7 Claims, 10 Drawing Sheets

(56) References Cited

U.S. PATENT DOCUMENTS

| | | | |
|---|---|---|---|
| 2009/0046239 A1 | 2/2009 | Watanabe | |
| 2011/0234967 A1* | 9/2011 | Kim | G02F 1/133351 |
| | | | 349/155 |
| 2013/0250227 A1* | 9/2013 | Kira | G02F 1/1339 |
| | | | 349/153 |
| 2016/0091743 A1* | 3/2016 | Yu | G02F 1/1339 |
| | | | 349/42 |

FOREIGN PATENT DOCUMENTS

| | | |
|---|---|---|
| JP | 2008-052095 A | 3/2008 |
| JP | 2010-096931 A | 4/2010 |
| WO | 2006/077838 A1 | 7/2006 |

\* cited by examiner

LIQUID CRYSTAL DISPLAY PANEL, LIQUID CRYSTAL DISPLAY PANEL BODY COMPONENT, AND METHOD OF PRODUCING LIQUID CRYSTAL DISPLAY PANELS

The present application is a Continuation in part of U.S. patent application Ser. No. 16/452,956, filed on Jun. 26, 2019, which claims benefit of Provisional Application No. 62/692,449 filed on Jun. 29, 2018. The entire disclosure of such parent application is incorporated herein by reference.

TECHNICAL FIELD

The present invention relates a liquid crystal display panel, a liquid crystal display panel body component, and a method of producing liquid crystal display panels.

BACKGROUND ART

A known liquid crystal display panel includes two opposing substrates and a liquid crystal material sealed between the substrates with a sealing material. The liquid crystal display panel has a display area on which an image is displayed and a non-display area on which an image is not displayed. The non-display area typically extends in a frame-like shape (hereinafter, referred to as a frame-shaped region) along the outer periphery of the liquid crystal display panel and has a main sealing portion that seals the liquid crystal material. It is important to have a uniform cell gap to reduce display unevenness in the liquid crystal display panel. In particular, a non-uniform cell gap near the frame-shaped region of the liquid crystal display panel leads to not only brightness unevenness but also lower adhesion between the substrates at the main sealing portion. In this specification cell gap is a distance between plate surfaces of transparent substrates included in the two substrates of the liquid crystal display panel.

In a common method of producing the liquid crystal display panel, a liquid crystal display panel body component including rows of multiple liquid crystal display panels is produced, and n the liquid crystal display panel body component is separated into individual liquid crystal display panels. Two substrates are assembled together with a predetermined cell gap therebetween in the production of the liquid crystal display panel body component. Uniform dispersion of the load applied during the assembling is required to produce liquid crystal display panels having a uniform cell gap. To achieve this, dummy sealing portions having a predetermined thickness may be disposed outwardly from the main sealing portions, which seal the liquid crystal material of the liquid crystal display panels. For example, Patent Document 1 listed below describes a liquid crystal display panel in which the diameter of spacers in the dummy sealing resin is set to be equal to a total of the thickness of the frame-shaped light-blocking layer (BM frame), which extends along the outer periphery of each cell, and the diameter of spacers in the main sealing resin, which is applied on the light-blocking layer, to reduce a non-uniform cell thickness in and around the frame-shaped region.

RELATED ART DOCUMENT

Patent Document

[Patent Document 1] Japanese Unexamined Patent Application Publication No. 2003-107498

SUMMARY OF THE INVENTION

Problem to be Solved by the Invention

By the way, an "intrusion phenomenon" in which a liquid crystal material containing a sealing material component penetrates into the display area AA may occur depending on the relative positional relationship between the opposing surfaces of the substrates in and around the frame-shaped region. The intrusion phenomenon leads to leakage of light in the liquid crystal display panel. If the degree of leakage is high, myriad spots of leaked light at the outer peripheral portion of the display area would be recognized as macroscopic white spots, leading to a significant decrease in the display quality of the liquid crystal display panel. As the frame width of recent liquid crystal display panels increasingly becomes smaller, the frame-shaped region becomes smaller, allowing the liquid crystal material containing a sealing material component to readily reach the display area. Furthermore, a liquid crystal display panel may be used in an in-vehicle liquid crystal display device, which is repeatedly exposed to high temperatures and low temperatures. In such a case, the sealing material component of the main sealing portion is likely to ooze into the liquid crystal material, because the thermal expansion rate of the liquid crystal material differs from that of the substrates. This readily causes the intrusion phenomenon.

In the liquid crystal display panel of the above described literature, the intrusion phenomenon is hardly effectively prevented, which is a problem to be solved.

The technology described herein was made in view of the above circumstance, and an object thereof is provide a liquid crystal display panel in which a decrease in the display quality is reduced.

Means for Solving the Problem (1) An embodiment of the technology disclosed herein a liquid crystal display panel including a first substrate, a second substrate opposing the first substrate, a liquid crystal layer between the first substrate and the second substrate, and a main sealing portion that is disposed in a circular shape to surround the liquid crystal layer and assembles the first substrate and second substrate together to seal the liquid crystal layer between the substrates, in which a distance between opposing surfaces of the first substrate and the second substrate in a main attachment region of the substrates where the main sealing portion is disposed is smaller at an innermost peripheral portion than at the other portions.

(2) Furthermore, an embodiment of the technology disclosed herein is the liquid crystal display panel in which, in addition to the above-described configuration (1), the first substrate includes a light-blocking layer that blocks light at least over a frame-shaped light-blocking region adjacent to an inner periphery of the main attachment region, and the distance between the opposing surfaces of the first substrate and the second substrate in the frame-shaped light-blocking region is smaller than that in the main attachment region.

(3) Furthermore, an embodiment of the technology disclosed herein is a liquid crystal display panel body component including rows of liquid crystal display panels each including a first substrate including a first transparent substrate, a second substrate including a second transparent substrate and opposing the first substrate, and a main sealing portion assembling the first substrate and the second substrate together and sealing a liquid crystal layer between the first and second substrates. The liquid crystal display panel body component includes a first mother substrate including rows of first substrates and including a first mother transparent substrate including rows of first transparent substrates, a second mother substrate including rows of second substrates and including a second mother transparent substrate including rows of second transparent substrates, multiple main sealing portions each disposed in a circular shape and located between the first mother substrates and the second mother substrates, and dummy sealing portions located between the main sealing portions adjacent to each other and assembling the first mother substrate and the second mother substrate together, in which a distance between plate surfaces of the first mother transparent substrate and the second mother transparent substrate in a dummy attachment region of the mother substrates where the dummy sealing portions are disposed is larger than that in a main attachment region where the main sealing portions are disposed.

(4) Furthermore, an embodiment of the technology disclosed herein is the liquid crystal display panel body component which, in addition to the above-described configuration (3), the distance between the plate surfaces of the first mother transparent substrate and the second mother transparent substrate in the dummy attachment region is larger than 1.00 times and not more than 1.20 times of that in the main attachment region.

(5) Furthermore, an embodiment of the technology disclosed herein is the liquid crystal display panel body component which, in addition to the above-described configuration (3) or (4), a light-blocking layer that blocks light is disposed on a surface of each of the first transparent substrates on the second substrates side at least over a frame-shaped light-blocking region adjacent to an inner periphery of the main attachment region, and a distance between plate surfaces of the first transparent substrates and the second transparent substrates in the frame-shaped light-blocking region is smaller than that in the main attachment region.

(6) Furthermore, an embodiment of the technology disclosed herein is the liquid crystal display panel body component further including, in addition to the above-described configuration (5), a protruded spacer in the frame-shaped light-blocking region. The protruded spacer protrudes from one of opposing surfaces of the first substrate and the second substrate to the other of the opposing surfaces of the first and second substrates to define a distance between the opposing surfaces of the substrates. The protruded spacer occupies less than 2% of the area of the frame-shaped light-blocking region with the total area of bottoms thereof on one of the first and second substrates or with the total area of heads thereof in contact with the other of the first and second substrates, whichever is the larger.

(7) Furthermore, an embodiment of the technology disclosed herein is the liquid crystal display panel body component according to any one of claims 3 to 6, in which, in addition to the above-described configurations (3) to (6), the dummy sealing portion is directly fixed to the first mother transparent substrate and the second mother transparent substrate.

(8) Furthermore, an embodiment of the technology disclosed herein is the liquid crystal display panel body component which, in addition to the above-described configuration (7), the dummy sealing portion includes dummy spacers defining a thickness of the dummy sealing portion, and the thickness of the dummy sealing portion is larger than the distance between plate surfaces of the first mother transparent substrate and the second mother transparent substrate in the main attachment region.

(9) Furthermore, an embodiment of the technology disclosed herein is a method of producing liquid crystal display panels. The method includes a main sealing material application process of applying a main sealing material to be a main sealing portion in a circular shape to multiple positions on a first mother substrate, a dummy sealing material application process of applying a dummy sealing material to be a dummy sealing portion to positions between the positions of the main sealing material on the first mother substrate, a sealing portion formation process of curing the main sealing material and the dummy sealing material on the first mother substrate disposed over the second mother substrate to form the main sealing portions and the dummy sealing portions and assembling the first mother substrate and the second mother substrate together such that a liquid crystal display panel body component according to any one of the above (3) to (8) is produced, and a liquid crystal display panel separation process of separating the liquid crystal display panel body component into the liquid crystal display panels.

(10) Furthermore, an embodiment of the technology disclosed herein is the method of producing liquid crystal display panels in which, in addition to the above-described configuration (9), the first mother substrate and the second mother substrate are assembled together by pressure in the sealing portion formation process.

The inventors conducted a comprehensive study and found that the intrusion phenomenon in which the liquid crystal material containing a sealing material component penetrates into the display area is less likely to occur in the liquid crystal display panel having the above-described configuration.

In the above-described configuration, the distance between the substrates in the main attachment region is smallest at the innermost peripheral portion. This probably reduces the influence of expansion or contraction of the liquid crystal layer on the main sealing portion. Herein, the term "opposing surfaces of substrates" refers to top surfaces of layered structures on opposing the substrates.

For example, when the opposing surfaces of the substrates have no step, the distance between the opposing surfaces of the substrates increases toward the outer periphery of the main attachment region in the above-described configuration. In the main attachment region, the opposing surfaces are oriented toward the outer peripheral side (distance between the substrates increases toward the outer peripheral side). In such a liquid crystal display panel, when the liquid crystal material is expanded or contracted, the sealing material itself is less likely to move from the initial position to the inner peripheral side or the sealing material component is less likely to ooze into the liquid crystal material on the inner peripheral side, compared with a liquid crystal display panel having parallel substrates or substrates oriented toward an inner peripheral sides (distance increases toward the liquid crystal layer).

As a result, it is possible to obtain a liquid crystal display panel in which the intrusion phenomenon of the sealing material is reduced and the occurrence of display defects in the display area around the periphery of the liquid crystal display panel, that is, the frame area is reduced.

Herein, the term "circular shape" means not only a shape extending a circle or an elongated circle, but also a shape extending along an outline of a polygon such as a rectangle, or a shape extending along an outline of an amorphous shape. Furthermore, the term means not only a closed ring shape, but also a shape having an opening, which functions as an inlet of a liquid crystal material, for example.

The present technology also provides a liquid crystal display panel body component including rows of multiple liquid crystal display panels each including a first substrate including a first transparent substrate, a second substrate including a second transparent substrate and opposing the first substrate, and a main sealing portion assembling the first substrate and the second substrate together and sealing a liquid crystal layer between the first and second substrates. The liquid crystal display panel body component includes a first mother substrate including rows of first substrates and including a first mother transparent substrate including rows of first transparent substrates, a second mother substrate including rows of second substrates and including a second mother transparent substrate including rows of second transparent substrates, multiple main sealing portions each disposed in a circular shape and located between the first mother substrate and the second mother substrate, and dummy sealing portions that are located between the main sealing portions adjacent to each other and assembles the first mother substrate and the second mother substrate together. A distance between plate surfaces of the first mother transparent substrate and the second mother transparent substrate in a dummy attachment region of the mother substrates where the dummy sealing portion is disposed is larger than that in a main attachment region where the main sealing portions are disposed.

In the above-described configuration, the distance between the mother transparent substrates or the cell gap in the dummy attachment region, which is located outwardly from the main attachment region, is larger than that in the main attachment region. Thus, the transparent substrates are oriented in a non-parallel direction toward the outer peripheral side (distance between the substrates increases toward the outer peripheral side). The liquid crystal display panel body component having the above-described configuration is readily produced by adjusting the thickness of the dummy sealing portion according to the cross-sectional configuration of the main attachment region and the dummy attachment region. The liquid crystal display panel body component is separated into the liquid crystal display panels having the above-described configuration.

The present technology provides a method of producing the liquid crystal display panels. The method includes a main sealing material application process of applying a main sealing material to be a main sealing portion in a circular shape to multiple positions on a first mother substrate, a dummy sealing material application process of applying a dummy sealing material to be a dummy sealing portion to positions between the positions of the main sealing material on the first mother substrate, a sealing portion formation process of curing the main sealing material and the dummy sealing material on the first mother substrate disposed opposite to the second mother substrate to form the main sealing portions and the dummy sealing portion and assembling the first mother substrate and the second mother substrate together such that a liquid crystal display panel body component according to any one of claims 3 to 8 is produced, and a liquid crystal display panel separation process of separating the liquid crystal display panel body component into the liquid crystal display panels.

In the above-described configuration, the liquid crystal display panel body component having the above-described configuration is readily produced. In the above-described method, the main sealing material application process may be performed before or after the dummy sealing material application process. Furthermore, the liquid crystal material may be applied to an area surrounded by the main sealing material before the sealing portion formation process or may be injected to the area surrounded by the main sealing material after the sealing portion formation process.

Advantageous Effects of Invention

According to the technology, a liquid crystal display panel in which a frequency of display defects is reduced particularly at the outer peripheral portion is obtained and a liquid crystal display device having high display reliability can be produced.

MODE FOR CARRYING OUT THE INVENTION

First Embodiment

A first embodiment is described with reference to FIG. 1 to FIG. 7.

Figure 1:
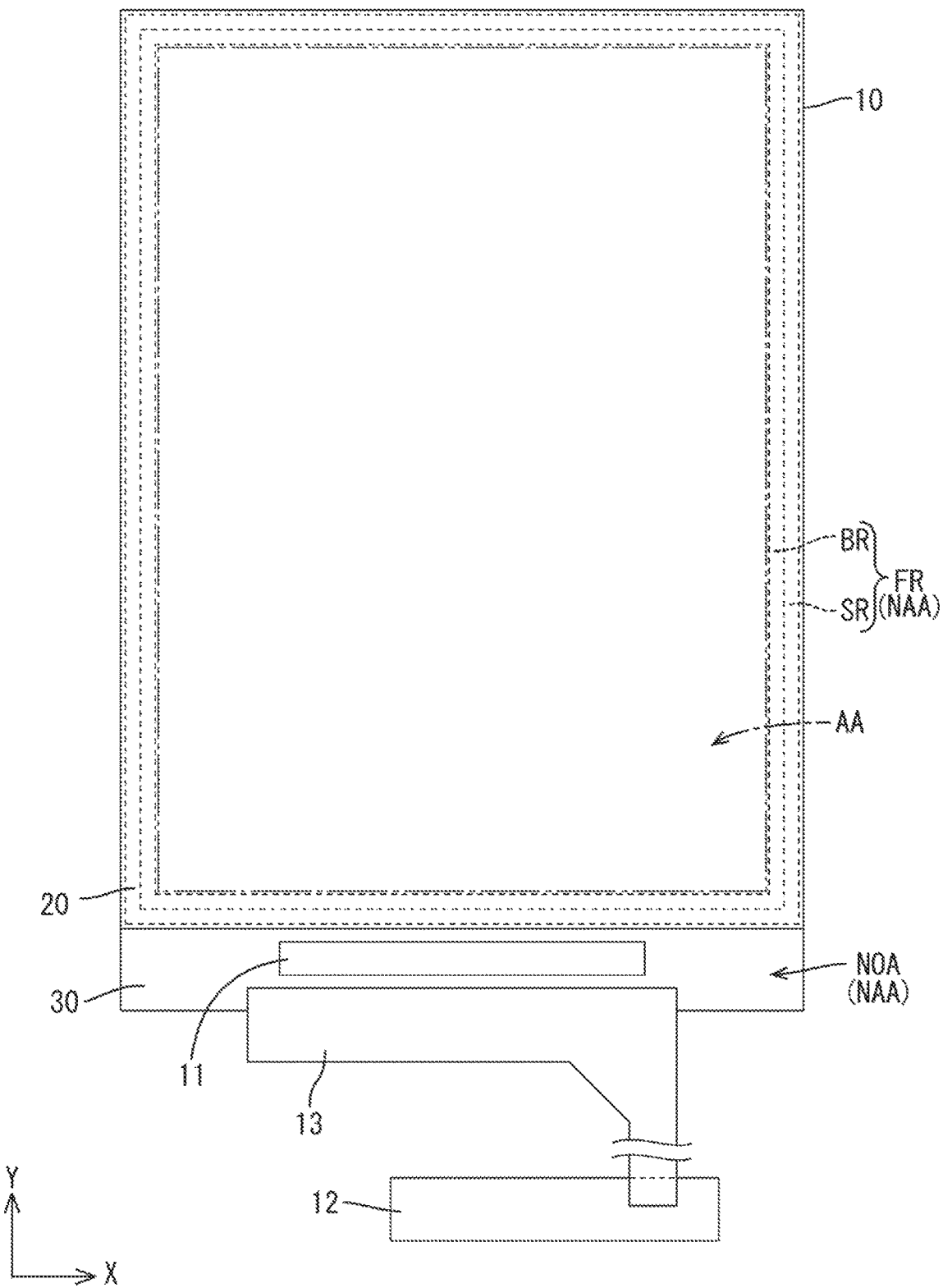
FIG. 1 is a schematic view illustrating an outline of a planar configuration of a liquid crystal display panel according to a first embodiment.
Figure 2:
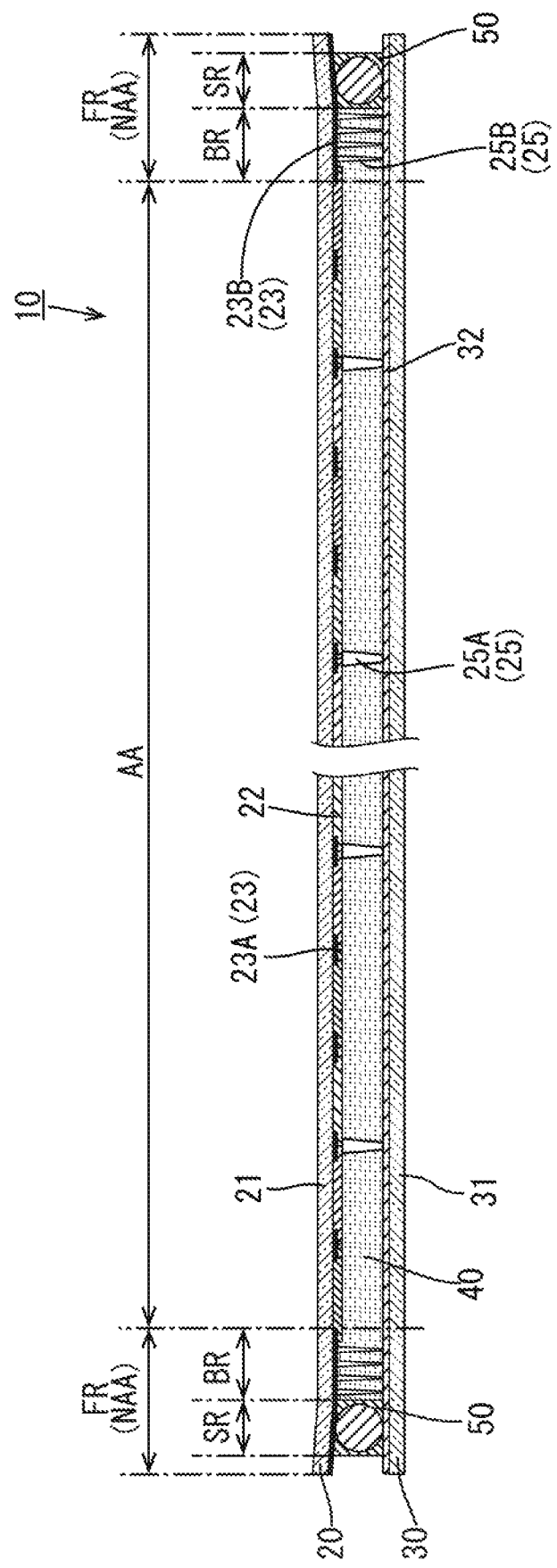
FIG. 2 is a schematic view illustrating an outline of a cross-sectional configuration of the liquid crystal display panel.

In this embodiment, a liquid crystal display panel 10 included in a liquid crystal display device is described as an example. In the following description, the upper side and the left side in FIG. 1 are, respectively, referred to as an upper side and a left side (the lower side and the right side are, respectively, referred to as a lower side and a right side), and the upper side in FIG. 2 is referred to as a front side (the lower side is referred to as a rear side). For the identical components, one of them is designated with a reference numeral and the reference numeral for the others is omitted in some cases.

The liquid crystal display panel 10 is suitable for liquid crystal display devices for various electronic devices, such as in-vehicle liquid crystal display devices, e.g., a car navigation system, notebook computers (including a tablet computer), wearable devices (including a smart watch), portable information devices (including an electronic book and a PDA), mobile phones (including a smart phone), and portable game consoles. The liquid crystal display panel 10 has a screen size of about a few inches to about a dozen inches, which categorized as a small size or a small to medium size in general. The present technology is particularly suitable for an in-vehicle liquid crystal display device having a screen size of about 5 to about 13 inches, which is required to have a smaller frame size and subjected to large temperature changes, but the application of the technology is not limited thereto. For example, the technology is applicable to a liquid crystal display device having a screen size of tens of inches, which is categorized as a medium or large (very large) size, such as an outdoor screen.

FIG. 1 schematically illustrates a planar configuration of the liquid crystal display panel 10. As illustrated in FIG. 1, the liquid crystal display panel 10 according to the first embodiment has a vertically long rectangular (quadrilateral) overall shape. The liquid crystal display panel 10 includes two substrates 20 and 30. Of the substrates 20 and 30, the front side is a CF substrate (color filter substrate, counter substrate, one example of a first substrate) 20 and the rear side is an array substrate (TFT substrate, active matrix substrate, one example of a second substrate) 30. The substrates 20 and 30 have substantially the same length in the left-right direction but the CF substrate 20 has a smaller length in the up-down direction than the array substrate 30. The substrates 20 and 30 face each other with the upper short sides being put together. The liquid crystal display panel 10 has a substrate non-overlapping area NOA, which does not have the CF substrate 20, along a lower short side, and the other area of the liquid crystal display panel 10 is a substrate overlapping area. The entire area of the plate surface of the CF substrate 20 is the substrate overlapping area. The array substrate 30 has the substrate non-overlapping area NOA along the lower short side. As illustrated in FIG. 1, driving parts such as a driver 11 that drives the liquid crystal display panel 10 is mounted in the substrate non-overlapping area NOA and a transmission component such as a flexible board 13 that transmits an electrical drive signal from an external signal source 12 is connected to the substrate non-overlapping area NOA.

The middle portion of the substrate overlapping area is a display area AA (active area) on which an image is displayed. The portion except for the display area, the outer peripheral portion of the substrate overlapping area and the entire substrate non-overlapping area NOA, is a non-display area NAA (non-active area). Hereinafter, a frame-shaped region of the non-display area NAA extending along the outer periphery of the substrate overlapping area to surround the display area AA is referred to as a frame-shaped region FR. An inner peripheral portion of the frame-shaped region FR is a frame-shaped light-blocking region BR and an outer peripheral portion thereof is a main attachment region SR. As described below, at least a frame-shaped light-blocking layer 23B and a liquid crystal layer 40 are disposed in the frame-shaped light-blocking region BR, and a main sealing portion 50 is disposed in the main attachment region SR.

FIG. 2 schematically illustrates a cross-sectional configuration of the liquid crystal display panel 10. As schematically illustrated in FIG. 2, the liquid crystal display panel 10 includes the CF substrate 20, the array substrate 30, and a liquid crystal layer 40 sealed between the substrates 20 and 30 by the main sealing portion 50.

The CF substrate 20 and the array substrate 30 each include a transparent substrate having heat resisting properties, insulating properties, and high light-transmitting properties. The transparent substrates are referred to as a CF-substrate side transparent substrate (first transparent substrate) 21 and an array-substrate side transparent substrate (second transparent substrate) 31. The transparent substrates 21 and 31, which are formed of a glass plate or a transparent resin plate, for example, are both substantially colorless and substantially transparent and have a substantially smooth plate surface without steps. Various components (described later), are disposed on an inner surface of each of the transparent substrates 21 and 31 (opposing surfaces of the transparent substrates, surfaces adjacent the liquid crystal layer 40) to form the CF substrate 20 and the array substrate 30. A polarizing plate is attached to an outer surface of each of the transparent substrates 21 and 31 (surfaces opposite the opposing surfaces of the substrates, surfaces on an opposite side of the liquid crystal layer 40).

As illustrated in FIG. 2, for example, a light-blocking film (black matrix: BM) 23, which blocks light, color filters 22 including R (red), C (green), B (blue) coloring films alternately arranged, and an overcoat film are disposed on an inner surface of the CF-substrate side transparent substrate 21. The color filters 22 are disposed only in the display area AA. The light-blocking film 23 includes an inter-pixel light-blocking layer 23A, which is disposed between the color filters 22 in the display area AA to prevent mixture of colors, and a frame-shaped light-blocking layer 23B, which is disposed in a solid form over the entire frame-shaped region FR to prevent light leakage. In the first embodiment, the light-blocking film 23 has a substantially constant thickness (thickness $L_{23}$ in FIG. 5, which will be described later).

Protruded spacers 25 protrude from the overcoat film to keep a predetermined distance between the overcoat film and the array substrate 30. The protruded spacers 25 in the display area AA are display area spacers 25A arranged at a suitable interval. The protruded spacers 25 in the frame-shaped light-blocking region BR, which is an inner peripheral portion of the frame-shaped region FR, are frame-shaped region spacers 25B arranged in a predetermined arrangement density. The display area spacers 25A and the frame-shaped region spacers 25B may be simultaneously formed by photolithography, for example. In such a case, the spacers 25A and 25B are formed to have substantially the same protruded length. The spacers 25A and 25B in the first embodiment are formed in such an arrangement and an arrangement density as to have resistance to the pressure applied to a mother CF substrate 20M and a mother array substrate 30M, which include multiple substrates 20 and 30, during pressure assembling of the mother substrates 20M and 30M (described later) in the production of the liquid crystal display panel 10. In other words, in the first embodiment, after the mother substrates 20M and 30M are assembled together by pressure, a constant distance is kept between the opposing surfaces of the CF substrate 20 and the array substrate 30 in the display area AA and the frame-shaped light-blocking region BR (distance $D_{BR}$ in FIG. 5, which will be described later). For example, the frame-shaped region spacers 25B may have a slightly tapered shape, e.g., conical shape. In such a case, the arrangement density of the frame-shaped region spacers 25B may be set such that an area of bottoms of the frame-shaped region spacers 25B occupy 2.00% or more and less than 3.00% of the area of the frame-shaped light-blocking region BR.

Herein, the phrase "the opposing surface of the CF substrate 20 facing the array substrate 30" refers to the top surface of the layered structure on the inner surface of the CF-substrate side transparent substrate 21, except for the protruded spacers 25 (the same is applicable to the mother CF substrate 20M, which will be described later). Furthermore, herein, the phrase "the arrangement area of the protruded spacer" refers to the total area of the bottoms of the protruded spacers protruding from one of the substrates or the total area of the heads of the protruded spacers in contact with the other of the substrates, whichever is the larger.

A wiring layer 32 is disposed on an inner surface of the array-substrate side transparent substrate 31. The wiring layer 32 may include a single-layer film formed of one of metal materials selected from copper, titanium, aluminum, molybdenum, and tungsten, for example, or a multi-layer film formed of different kinds of metal materials, a wiring line formed of an alloy, an insulating film formed of an inorganic material such as silicon nitride (SiNx) and silicon oxide ($SiO_2$) or an organic material such as an acrylic resin (for example, PMMA), and a transparent electrode film formed of a transparent electrode material such as ITO (Indium Tin Oxide) and IZO (Indium Zinc Oxide). The films and the wiring line are each layered in a predetermined pattern. Herein, the phrase "the opposing surface of the array substrate 30 facing the CF substrate 20" refers to the top surface of the layered structure on the inner surface of the array-substrate side transparent substrate 31 (the same is applicable to the mother array substrate 30M, which will be described later).

In the wiring layer 32 on the display area AA, switching elements such as TFTs (Thin Film Transistors) and pixel electrodes are arranged in a matrix (rows and columns), and gate lines (scanning lines) and source lines (data lines, signal lines) are arranged in a grid pattern to surround the switching elements and the pixel electrodes. The gate lines, the source lines, and the pixel electrodes are connected to the switching elements. The switching elements are driven in response to the signals sent to the gate lines and the source lines. Supply of potential to the pixel electrodes is controlled based on the driving. For example, in the liquid crystal display panel 10 in which a common electrode overlaps the pixel electrodes, when a potential difference is caused between the pixel electrodes and the common electrode, a fringe electric field including an electric field parallel to the surface of the array substrate 30 is applied to the liquid crystal layer 40. Furthermore, the wiring layer 32 is also disposed over the frame-shaped region FR. The wiring line extending from the display area AA is routed in the frame-shaped region FR of the wiring layer 32 and connected to the driver and signal transmission components, for example, mounted on the substrate non-overlapping area NOA. The wiring layer 32 has a substantially constant thickness (thickness $L_{32}$ in FIG. 5, which will be described later) at least over the frame-shaped region FR.

In addition to the above-described components, alignment films are disposed on the innermost surfaces of the substrates 20 and 30 to sandwich the liquid crystal layer 40 from both sides. The alignment films are configured to align the liquid crystal molecules in the liquid crystal layer 40 in a predetermined direction (set the initial alignment of the liquid crystals without application of voltage). The alignment film is formed of polyimide, for example, and, when polarization light having a wavelength in a predetermined wavelength range (for example, ultraviolet light) is irradiated thereto, the alignment film is a photo-alignment film that aligns the liquid crystal molecules depending on the polarizing direction of the irradiated light. The alignment films may be subjected to an alignment process, such as rubbing, as necessary. The liquid crystal display panel 10 that operates in FFS (fringe field switching) mode, in which a fringe electric field is applied to the liquid crystal layer 40 as described above, uses a horizontal alignment film as the photo-alignment film. The horizontal alignment film allows the long axes of the liquid crystal molecules to be parallel substrate. The alignment films are formed in a solid form to cover at least the entire area on the display area AA of the substrates 20 and 30.

As illustrated in FIG. 2, the liquid crystal layer 40 sandwiched between the two substrates 20 and 30 contains liquid crystal molecules, which are substances whose optical properties are changed by application of an electrical field (orientation of liquid crystal molecules having dielectric constant anisotropy is changed by application of an electrical field), on the display area AA of the liquid crystal display panel 10. The liquid crystal molecules in an initial alignment in a predetermined direction are held by the above-described alignment films. Then, the alignment state of the liquid crystal molecules is changed by a fringe electrical field, which is applied thereto by the driving of the switching elements described above. This changes the state of light passing through the liquid crystal display panel 10 and allows an image to be displayed in the display area AA.

The liquid crystal layer 40 covers the entire display area AA covers the portion extended to the frame-shaped light-blocking region BR, which is the inner peripheral portion of the frame-shaped region FR. As described above, the color filter 22, which is disposed in the display area AA, is not disposed in the frame-shaped light-blocking region BR. Thus, the liquid crystal layer 40' thickness of the frame-shaped light-blocking region BR, which is adjacent to the main attachment region SR is thicker than that of the display area AA.

As illustrated in FIG. 2, the liquid crystal layer is sealed between the two substrates 20 and 30 with the main sealing portion 50, which is located between the two substrates 20 and 30 to assemble the substrates together. The main sealing portion 50 is formed of a main sealing material that includes a base resin component containing main spacers 51. The base resin of the main sealing material may be suitably selected from known sealing resins. The base resin is preferably a resin to be cured by an extrinsic stimulus, such as a photocurable resin or a thermosetting resin. The photocurable resin and the thermosetting resin may be used in combination. Specific examples of the resin include a photocurable acrylic resin and a thermosetting epoxy resin and so on. In the first embodiment, a thermosetting epoxy resin is used as the main sealing material. The thermosetting epoxy resin, which has a high glass-transition temperature and high-temperature reliability, is preferably used as an in-vehicle component, which may be exposed to high temperatures. The main sealing portion obtained thermosetting the epoxy resin has relatively high rigidity, which allows the sealing material component to ooze into the liquid crystal material and readily induces intrusion phenomenon. The present technology is particularly advantageous for a liquid crystal display panel that employs the thermoplastic epoxy resin as the main sealing material. The main spacer 51 is suitably selected from known spacers. The main spacers 51 are dispersedly mixed in the base resin by a predetermined method. The main spacer 51 is formed of a glass fiber or a silicon resin, for example, in view of dispersibility in the base resin. Preferable examples of the spacer include a fiber spacer having a predetermined diameter and a granular spacer having a predetermined diameter. The main spacer 51 having a predetermined diameter (diameter øS in FIG. 5, which will be described later) is suitably selected to keep the thickness of the main sealing portion 50 in a predetermined range.

As illustrated in FIG. 2, the main sealing portion 50 is disposed in a circular shape in the main attachment region SR, which is the outer peripheral portion of the frame-shaped region FR, to surround the liquid crystal layer 40. Herein, the term "circular shape" means not only a shape extending in a circle or an elongated circle, but also a shape extending along an outline of a polygon such as a rectangle, or a shape extending along an outline of an amorphous shape. Furthermore, the term means not only a closed ring shape, but also a shape having an opening, which functions as an inlet for a liquid crystal material, for example. As illustrated in FIG. 1, the main sealing portion 50 extends along the outer periphery of the substrate overlapping area to form a substantially closed rectangular overall shape in plan view (viewed in a direction normal to the plate surfaces of the substrates 20, 30) and seals the liquid crystal layer 40 in the area surrounded by the main sealing portion 50. In this configuration, as described above, the portion of the frame-shaped region FR of the non-display area NAA located outwardly from the frame-shaped light-blocking region BR is the main attachment region SR.

In the production of the liquid crystal display panel 10 (described later), the mother CF substrate (first mother substrate) 20M including rows of CF substrates 20 and the mother array substrate (second mother substrate) 30M including rows of array substrates 30 are separately produced, and the main sealing portions 50 is disposed before the mother substrates 20M and 30M are assembled. Thus, the main sealing portion 50 is in contact with the opposing surfaces of the substrates at the outer peripheral portion of the substrate overlapping areas of the substrates 20 and 30.

In the liquid crystal display panel 10 according to the first embodiment, the distance (corresponding to the distance $D_{SRI}$ in FIG. 5, which will be described later) between the CF substrate 20 and the array substrate 30 the main attachment region SR is the smallest at the innermost peripheral portion (portion adjacent to the liquid crystal layer 40) among the distances therebetween in the main attachment region SR. In other words, the CF substrate 20 and the array substrate 30 are assembled by the main sealing portion 50 such that the thickness of the sealing portion at the innermost peripheral portion adjacent to the liquid crystal layer 40 is smaller than that at the other portions. Specifically described, in the first embodiment, as illustrated in FIG. 2 (and FIG. 5 described later), in the main attachment region SR, at least the frame-shaped light-blocking layer 23B is disposed in a solid form on the inner surface (adjacent to the main sealing portion 50) of the CF-substrate side transparent substrate 21, and the wiring layer is disposed in a solid form as a whole on the inner surface (adjacent to the main sealing portion 50) of the array-substrate side transparent substrate 31. In the main attachment region SR, the opposing surfaces of the CF substrate 20 and the array substrate 30 are smooth. In the first embodiment, the distance between the smooth opposing surfaces increase toward the outer periphery such that the distance between the CF substrate 20 and the array substrate (corresponding to $D_{SRO}$ in FIG. 5, which will be describe later) is the largest at the outermost peripheral portion (portion away from the liquid crystal layer 40) among the distances in the main attachment region SR. In FIG. 2, for example, the array substrate 30 is flat, and the CF substrate 20 has an outer peripheral portion slightly warped toward the front side so as to be oriented toward the outer peripheral side. However, the CF substrate 20 may be flat, and the array substrate 30 may have an outer peripheral portion warped toward the rear side so as to be oriented toward the outer peripheral side, or the CF substrate 20 may have an outer peripheral portion warped toward the front side and the array substrate 30 may have an outer peripheral portion warped toward the rear side so as to be oriented toward the outer peripheral side.

Next, an example of a method of producing the liquid crystal display panel 10 having the above-described configuration is described.

A liquid crystal display panel body component 10M including rows of multiple liquid crystal display panels 10 is produced first and the liquid crystal display panel body component 10M is separated (liquid crystal display panel separation process) into individual liquid crystal display panels 10. In the method, the liquid crystal display panel body component 10M is produced through a main sealing material application process, a dummy sealing material application process, and a sealing portion formation process by using a mother CF substrate (one example of a first mother substrate) 20M including multiple CF substrates 20 arranged in rows and a mother array substrate (one example of a second mother substrate) 30M including multiple array substrates 30 arranged in rows.

In the production of the liquid crystal display panel body component 10M, a layered structure including the above-described various layers is patterned in advance on a CF-substrate side mother transparent substrate (one example of a first mother transparent substrate) 21M and an array-substrate side mother transparent substrate (one example of a second mother transparent substrate) 31M at predetermined positions to form the mother array substrate 30M and the mother Cr substrate 20M. The mother transparent substrates 21M and 31M have substantially smooth plate surfaces without a large step.

Figure 3:
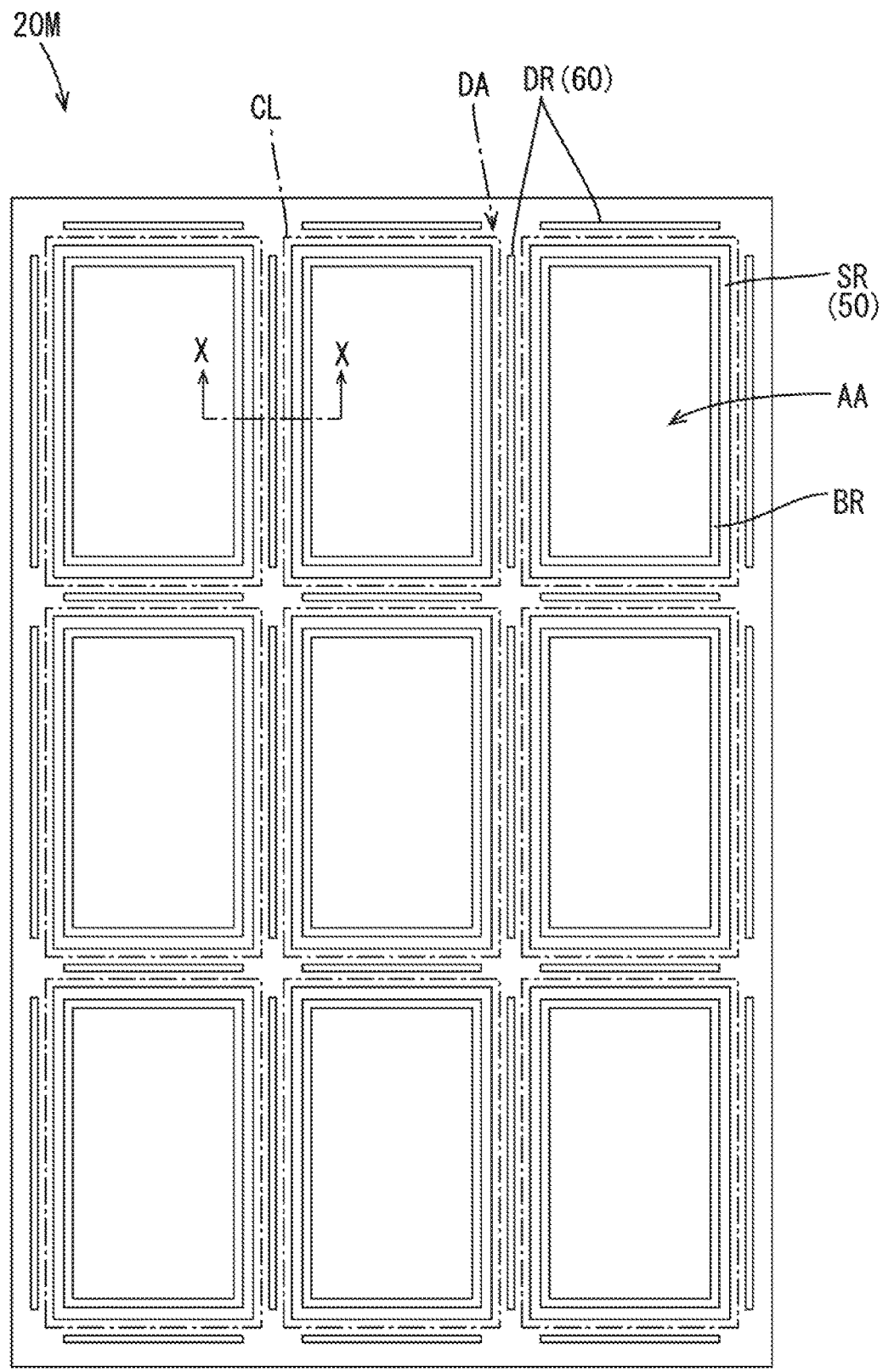
FIG. 3 is a schematic view illustrating an outline of a planar configuration of a mother CF substrate according to the first embodiment.

FIG. 3 schematically illustrates a planar configuration of the mother CF substrate 20M. As the mother CF substrate 20M illustrated in FIG. 3, the mother array substrate 30M and the mother CF substrate 20M may have lines, which indicate the display areas AA and the main attachment regions SR of the liquid crystal display panels 10 and the dummy attachment regions DR where dummy sealing portions 60 (described later) are disposed, and cutting lines CL, which are guidelines for separating the liquid crystal display panels 10. In FIG. 3, the area between the cutting lines CL, which are indicated by one-dot chain lines, is a dummy area DA. The dummy area DA is discarded after the separation of the liquid crystal display panels 10.

In the first embodiment, first, the main sealing material is applied to the main attachment region SR of the mother CF substrate 20M (main sealing material application process).

The main sealing material according to the first embodiment includes a thermosetting epoxy resin, for example, as a main component, and contains the main spacers 51, as described above about the main sealing portion 50. The main sealing material may further contain a curing agent, or a viscosity modifier, for example, as needed. The method of applying the main sealing material is not limited, and the main sealing material may be applied by any method. For example, the main sealing material may be applied by using a dispenser device or may be transferred after being applied on another base material.

The main sealing material according to the first embodiment is applied to multiple positions on the mother CF substrate 20M along the outer periphery of each of the CF substrates 20 in a substantially rectangular overall shape having an opening.

Next, a dummy sealing material, which forms the dummy sealing portion 60, is applied to the dummy attachment regions DR of the dummy area DA of the mother CF substrate 20M (dummy sealing material application process).

Like main sealing material, the dummy sealing material according to the first embodiment includes a base resin component containing dummy spacers 61 and a thermosetting agent or a viscosity modifier, for example, a needed. The same thermosetting epoxy resin as the one used in the main sealing material may be used as the base resin of the dummy sealing material. The dummy spacer 61 may be formed of a fiber spacer or a granular spacer, which are formed of a glass fiber or a silicon resin, for example, as the main spacer 51. The method of applying the dummy sealing material is not limited, and the dummy sealing material may be applied by any method as in the main sealing material. For example, the dummy sealing material may be applied by using a dispenser device or may be transferred after being applied on another base material. The method of applying the dummy sealing material is preferably the same as the method of applying the main sealing material to simplify the production equipment and the process management. In an example of the first embodiment, the dummy sealing material is applied by using a dispenser device. In the application by using a dispenser device, a constant distance between the dispenser nozzle and the mother CF substrate 20M is maintained by a laser displacement meter on a side of the dispenser nozzle, which allows the dispenser nozzle to follow bumps and dips on the mother CF substrate 20M. This stabilizes the accuracy of seal drawing.

As illustrated in FIG. 3, the multiplex dummy sealing materials according to the first embodiment are applied in multiple straight lines in the dummy area DA of the mother CF substrate 20M with a predetermined distance from linearly extending portions of the two adjacent main attachment regions SR. Although a preferable distance between the main attachment region SR and the dummy attachment region DR varies depending on a relative ratio of the thickness of the main sealing portion 50 to the thickness of the dummy sealing portion 60, the preferable distance is 2.7 mm or more and less than 6.5 mm, for example, in the liquid crystal display panel body component 10M according to the first embodiment. If the distance between the attachment regions is smaller than the above range, the accuracy of seal drawing would be lowered due to interference of sensing of the laser displacement meter with the applied seal, the substrates would be poorly assembled together due to a largely varied thickness of the outer peripheral portion of the liquid crystal display panel 10, or a display defect would be visible at the outer peripheral portion of the display area AA due to a non-uniform cell thickness. In contrast, if the distance between the attachment regions is larger than t above, the intrusion phenomenon would not be sufficiently prevented, or the mother array substrate 30M and the mother CF substrate 20M would be largely undulated because the substrates pressed during assembling have dented portions.

In an example of the first embodiment, the liquid crystal material is applied by a vacuum injection process. Before the liquid crystal material application process, the mother CF substrate 20M having the main sealing material and the dummy sealing material at multiple positions is positioned to face the mother array substrate 30M, and the main sealing material and the dummy sealing material are cured to the main sealing portions 50 and the dummy sealing portions 60 (sealing portion formation process).

Specifically described, the mother CF substrate 20M is disposed on the mother array substrate 30M with reference to alignment marks, for example, on the mother array substrate 30M and the mother CF substrate 20M. Then, a predetermined pressure is applied from the front side of the mother CF substrate 20M such that the main sealing material and the dummy sealing material on the mother CF substrate 20M are in close contact with the mother array substrate 30M. In such a state, main sealing material and the dummy sealing material are cured. For example, the main sealing material and the dummy sealing material each may include a thermosetting epoxy resin as a base resin. In such a case, a thermal pressure, which is effective to cure the thermosetting epoxy resin, is applied to simultaneously cure the main sealing material and the dummy sealing material and assemble the mother array substrate 30M and the mother CF substrate 20M together.

In this way, the liquid crystal display panel body component 10M in which the liquid crystal display panels 10 before injection of the liquid crystal material are arranged in rows and columns is produced.

The liquid crystal display panel body component 10M formed as above is cut along the cutting lines CL extending in the vertical and horizontal directions such the liquid crystal display panel body component 10M is separated into the liquid crystal display panels 10 (liquid crystal display panel separation process). In the liquid crystal display panel separation process, the dummy areas DA between the liquid crystal display panels 10 are removed as waste end materials.

Next, a liquid crystal material, which forms the liquid crystal layer 40, is applied to the area surrounded by the main sealing material (liquid crystal material application process). The liquid crystal material may be any known material without limitations and may be applied by any method such as a method using a vacuum injection process or a one drop fill process without limitations. In the first embodiment, the liquid crystal material is applied by using a vacuum injection process. The liquid crystal material is injected through the opening the main sealing material by using capillary action, and then the opening for injection is sealed in a sealing process.

In this way, the liquid crystal display panel 10 according to the first embodiment is produced.

Next, the structure of the liquid crystal display panel body component 10M, which is produced in the production process of the liquid crystal display panel 10, is described.

Figure 4:
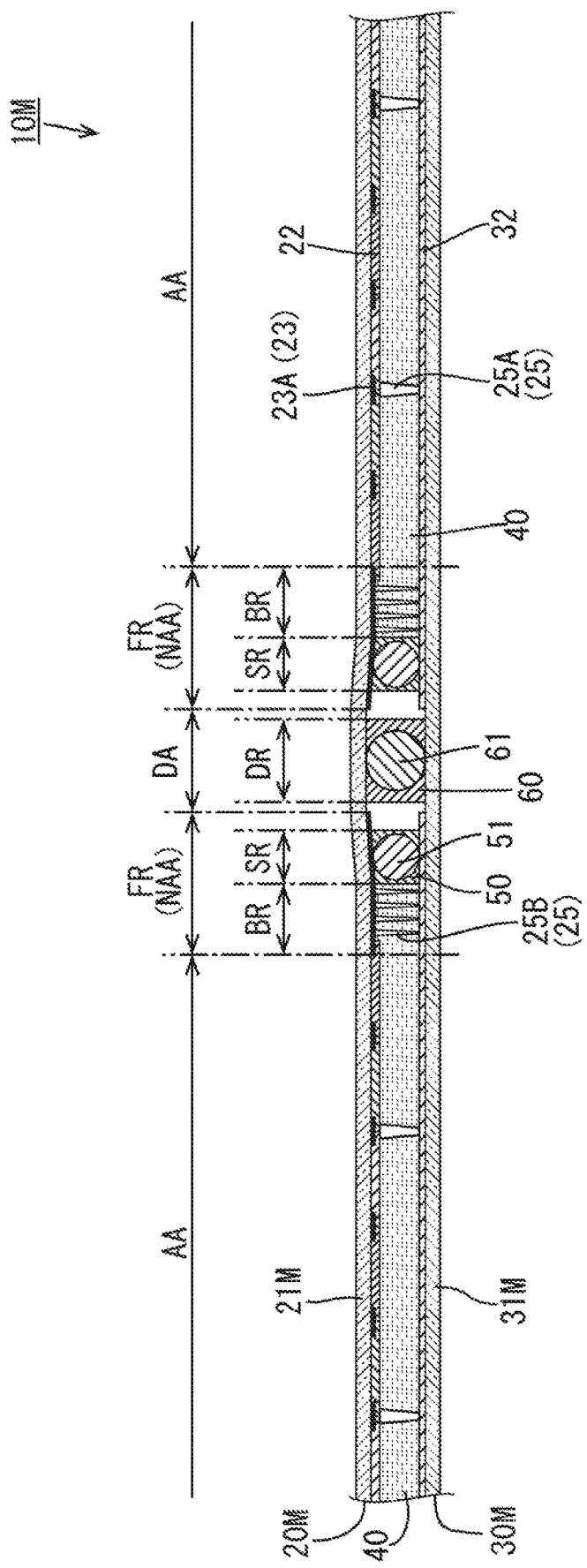
FIG. 4 is a schematic view illustrating an outline of a cross-sectional configuration of a portion of the liquid crystal display panel body component including the dummy attachment region.

FIG. 4 is a schematic view illustrating an outline of a cross-sectional configuration of quid crystal display panel body component 10M including the mother CF substrate 20M taken along line X-X in FIG. 3. As illustrated in FIG. 4, the liquid crystal display panel body component 10M includes the mother CF substrate 20M including the CF-substrate side mother transparent substrate 21M, the mother array substrate 30M including the array-substrate side mother transparent substrate 31M, the main sealing portions 50 disposed between the mother substrates 20M and 30M and each disposed in a circular shape to seal the liquid crystal layer 40, and the dummy sealing portions 60 disposed between the adjacent main sealing portions 50 to assemble the mother substrates 20M and 30M together.

Figure 5:
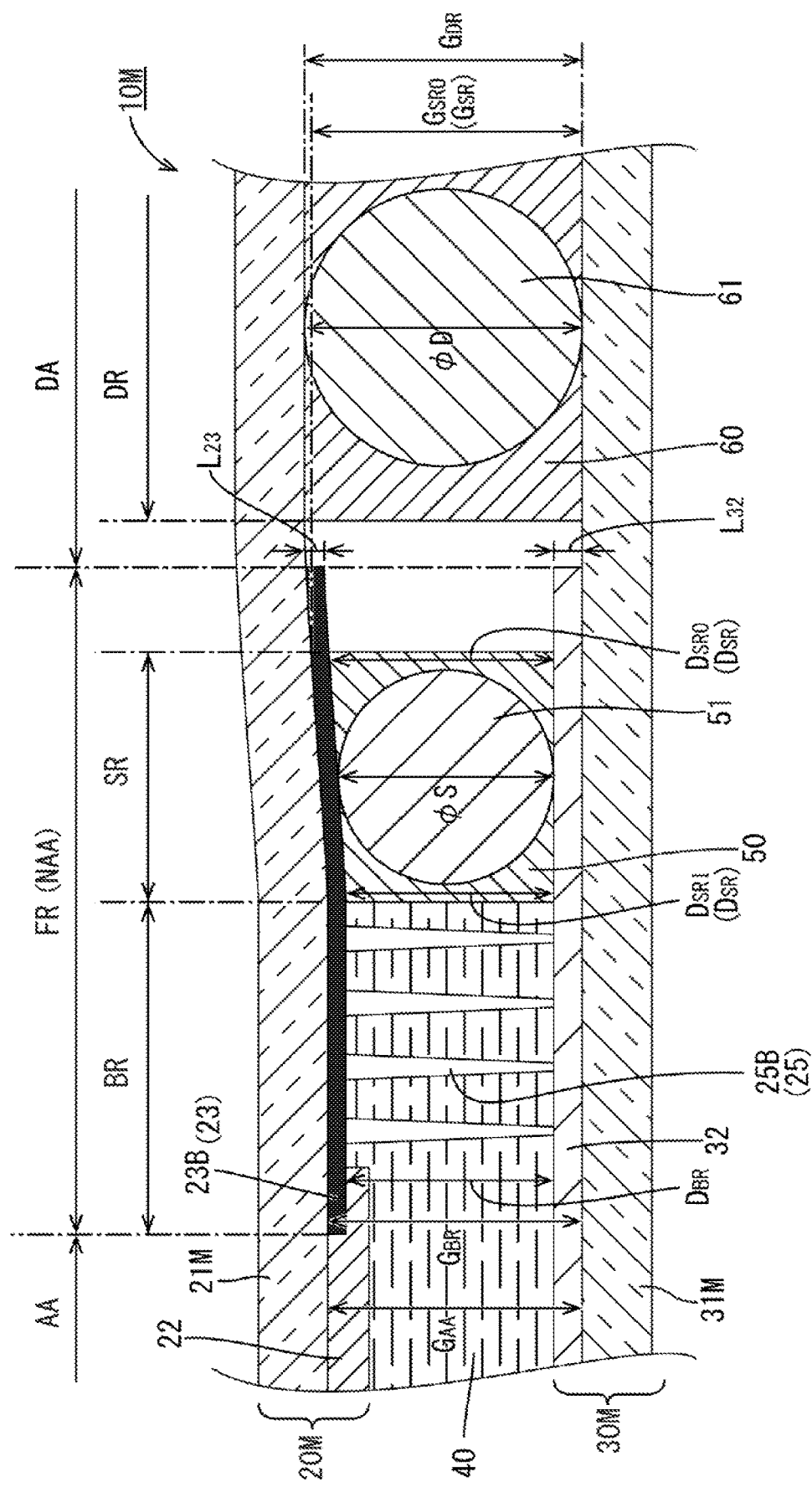
FIG. 5 is a schematic view illustrating an outline of a cross-sectional configuration of a portion of the liquid crystal display panel body component including the main attachment region.

FIG. 5 is a magnified view of a portion including the dummy attachment region DR, the main attachment region SR, and the frame-shaped light-blocking region BR, which are included in the cross-sectional view of the liquid crystal display panel body component 10M in FIG. 4. As illustrated in FIG. 5, a cell gap (distance between the plate surfaces of the CF-substrate side mother transparent substrate 21M and the array-substrate side mother transparent substrate 31M) $G_{DR}$ in the dummy attachment region DR is larger than a cell gap $G_{AA}$ in the display area AA and the cell gap $G_{SR}$ in the main attachment region SR (in particular, a cell gap $G_{SPO}$ at the outermost peripheral portion of the main attachment region SR). In other words, the mother transparent substrates 21M and 31M are fixed to the main sealing portion 50 in the main attachment region SR such that a distance between the substrates increases toward the outer peripheral side.

In the liquid crystal display panel body component 1ON according to the first embodiment, the frame-shaped light-blocking layer 23B having a thickness $L_{23}$ is disposed on the inner surface of the CF-substrate side mother transparent substrate 21M over the frame-shaped light-blocking region BR and the main attachment region SR, and the wiring layer 32 having a thickness $L_{32}$ is disposed in a solid form on the inner surface of the array-substrate side mother transparent substrate 31M. The cell gap $G_{SR}$ in the main attachment region SR is substantially equal to the total of the distance $D_{SP}$ between the opposing surfaces of the mother CF substrate 20M and the mother array substrate 30M (hereinafter referred to as a substrate distance), the thickness $L_{23}$ of the frame-shaped light-blocking layer 23B, and the thickness $L_{32}$ of the wiring layer 32.

In the first embodiment, the thickness of the main sealing portion 50 is defined by a diameter øS of the main spacer 51 in the thickness direction and the thickness of the dummy sealing portion 60 is defined by a diameter øD of the dummy spacer 61 in the thickness direction. In such a case, the diameter øD of the dummy spacer 61 is set to be larger than the total of the diameter øS of the main spacer, the thickness $L_{23}$ of the frame-shaped light-blocking layer 23B, and the thickness $L_{32}$ of the wiring layer 32 (øD≈$G_{DR}$>øS+$L_{23}$+$L_{32}$≈$G_{SR}$).

In the liquid crystal display panel body component 10M designed as above, when the mother substrates 20M and 30M are assembled together by pressure, the mother transparent substrates 21M and 31M are pressed against each other. In such a state, in the display area AA and the frame-shaped light-blocking region BR, the substrate distance between the mother substrates 20M and 30M, which is defined by the display area spacer 25A and the frame-shaped region spacer 25B, is kept at a predetermined distance, and the cell gap $G_{AA}$ in the display area AA and the cell gap $G_{BR}$ in the frame-shaped light-blocking region BR are kept at the same constant distance. In contrast, the outer peripheral portion including the main attachment region SR of the frame-shaped region FR is forced to expand by the dummy sealing portion 60 and the CF-substrate side mother transparent substrate 21M and/or the array-substrate side mother transparent substrate 31M warps to be away from the other. In the main attachment region SR, the innermost peripheral portions of the mother CF substrate 20M and the mother array substrate 30M are brought closer to each other by leverage applied to the mother substrates 20M and 30M. The substrate distance $D_{SR}$ between the mother substrates 20M and 30M is smaller at the innermost peripheral portion than that at the outer peripheral portion ($D_{SRI}$<$D_{SRO}$).

In such a state, the main sealing portions 50 and the dummy sealing portions 60 are cured to produce the liquid crystal display panel body component 10M in which the substrate(s) has the fixed warped shape. The dummy area DA including the dummy attachment region DR is removed from the liquid crystal display panel body component 10M such that the liquid crystal display panel body component 10M is separated into the liquid crystal display panels 10 according to the first embodiment.

Figure 6:
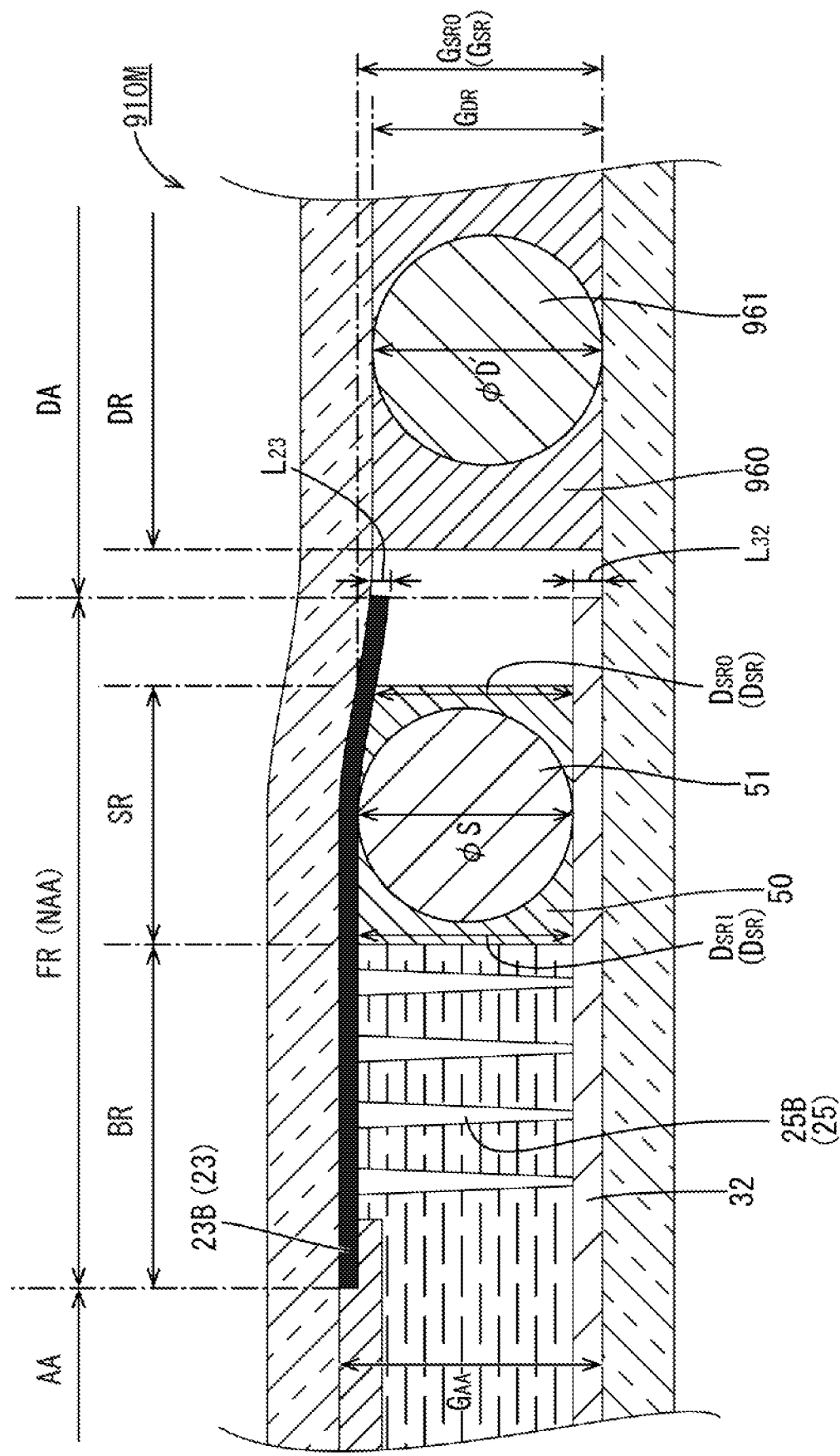
FIG. 6 is a schematic view illustrating an outline of a cross-sectional configuration of a portion of a comparative liquid crystal display panel body component including the main attachment region.

For comparison with the liquid crystal display panel body component 10M, FIG. 6 schematically illustrates a cross-sectional configuration of a portion of a liquid crystal display panel body component 910M including a main attachment region SR, in which a thickness of a dummy sealing portion 960 defined by the diameter øD' of a dummy spacer 961 in the thickness direction differs from that of the dummy sealing portion 60 of the liquid crystal display panel body component 10M. As illustrated in FIG. 6, the comparative liquid crystal display panel body component 910M, the diameter øD' of the dummy spacer 961 is slightly larger than the diameter øS of the main spacer 51 and smaller than the total of the diameter øS of the main spacer, the thickness $L_{23}$ of the frame-shaped light-blocking layer 23B, and the thickness $L_{32}$ of the wiring layer 32, and the cell gap $G_{DR}$ in the dummy attachment region DR is smaller than the cell gap $G_{AA}$ in the display area AA and the cell gap $G_{SR}$ in the main attachment region SR (in particular, the cell gap $G_{SRO}$ at the outermost peripheral portion of the main attachment region SR) (øD'≈$G_{DR}$<øS+$L_{23}$+$L_{32}$≈$G_{SR}$).

In the liquid crystal display panel body component 910M designed as above, when the mother substrates 20M and 30M are assembled together by pressure, the outer peripheral portions in the frame-shaped region FR are pressed against each other, and the CF-substrate side mother transparent substrate 21M and/or the array-substrate side mother transparent substrate 31M deform inwardly toward each other at the outer peripheral portion(s). Due to the deformation, in the main attachment region SR, a stress to move the mother CF substrate 20M and the mother array substrate 30M away from each other is applied to the innermost peripheral portions, and thus the substrate distance $D_{SR}$ between the substrates 20M and 30M is larger at the innermost peripheral portion than that at the outer peripheral portion ($D_{SRI}$>$D_{SRO}$).

Verification Experiment 1

Here, a verification experiment 1 was conducted to examine how the display reliability of the liquid crystal display panel is affected by the thickness of the dummy sealing portion.

In the verification experiment 1, liquid crystal display panel body components having the dummy attachment regions DR with different cell gaps $G_{DR}$, or having the dummy sealing portions 60 with different thicknesses, were each separated into liquid crystal display panels, and the liquid crystal display panels separated from the respective liquid crystal display panel body components were used as samples of an example 1 and comparative examples 1 to 3. The samples were liquid crystal display panels each having a cell thickness of 3 μm, which is suitable for a 10.21 in-vehicle monitor, and were separated from the liquid crystal display panel body components designed to have the following cell gaps $G_{DR}$ in the dummy attachment regions DR with respect to the cell gap $G_{SP}$ in the main attachment region SR.

| | |
|---|---:|
| $G_{DR}=G_{SP}+0.1$ μm | Example 1: |
| $G_{DR}=G_{SR}\pm 0$ μm | Comparative Example 1: |
| $G_{DR}=G_{SR}-0.1$ μm | Comparative Example 2: |
| $G_{DR}=G_{SR}-0.2$ μm | Comparative Example 3: |

The samples were held in a test tank and subjected to a thermal shock cycle test in which thermal shocks of −40° C. to 85° C. were repeatedly applied to the samples. The display conditions of the samples after 300 cycles were checked and the frequencies of visible display defects on the outer peripheral portions of the display areas AA were compared.

Figure 7:
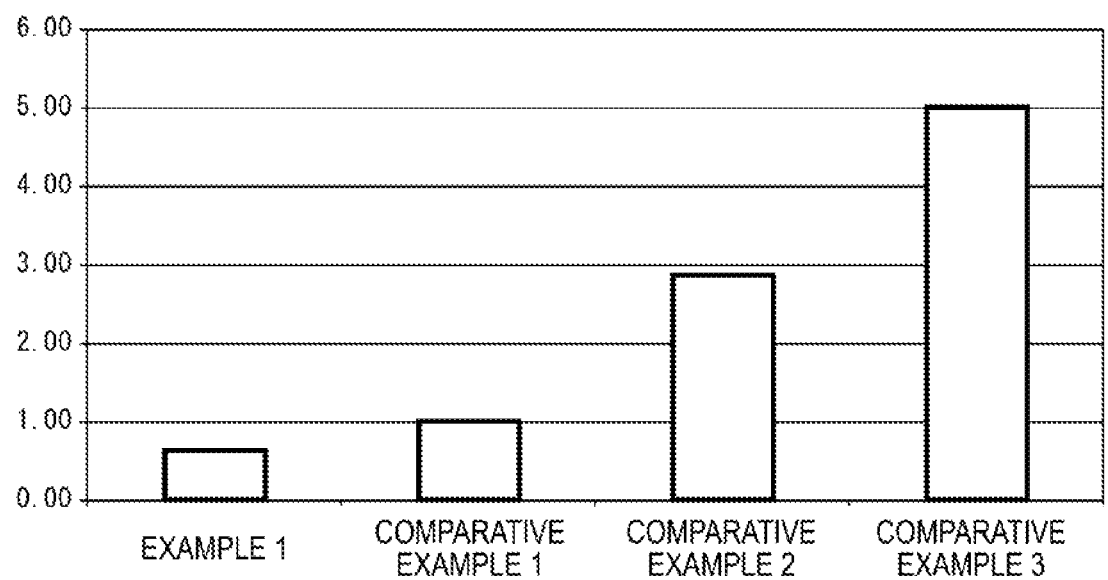
FIG. 7 is a graph indicating frequencies (relative value) of display defects observed at an outer peripheral portion of each of liquid crystal display panels.

FIG. 7 is a graph indicating the results of the verification experiment 1. A thermal shock cycle test, which was employed in the verification experiment 1, is one of tests for evaluating the display reliability of in-vehicle models used in a tough environment. Under the testing conditions of the verification experiment, the liquid crystal materials of the samples were repeatedly contracted and expanded and had a variation in volume by 10% to 15%. In particular, as described above, the liquid crystal layer is thick in the frame-shaped region FR, which is the outer peripheral portion of the liquid crystal display panel, because the frame-shaped region FR does not have a color filter, for example, and thus the amount of change in volume of the liquid crystal material is inevitably large. Thus, the "intrusion phenomenon", in which a liquid crystal material containing the sealing material component leaked from the main sealing portion penetrates into the display area AA, is likely to occur in the display area AA near the frame-shaped region FR.

As described above, the liquid crystal display panel of the comparative example 1 was separated from the liquid crystal display panel body component having a constant cell gap over the entire area of the mother transparent substrates (having a flat overall shape). Hereinafter, experiment results of the liquid crystal display panels will be discussed by using the liquid crystal display panel of the comparative example 1 as a reference.

As indicated in FIG. 7, when the frequency of display defects at the outer peripheral portion of the display area AA in the comparative example 1 is defined as 1.00, the frequencies in the liquid crystal display panels of comparative examples 2 and 3, which were separated from liquid crystal display panel body components having a thinner dummy sealing portion (i.e., the cell gap $G_{DR}$ in the dummy attachment region DR is smaller than the cell gap $G_{SR}$ in the main attachment region SR), were respectively 2.86 and 5.00. The frequency of display defects apparently increases with the thickness of the dummy sealing portion decreases. In contract, the frequency of the display defects in the liquid crystal display panel of the example 1, which was separated from the liquid crystal display panel body component having a thicker dummy sealing portion (i.e., the cell gap $G_{DR}$ in the dummy attachment region DR is larger than the cell gap $G_{SR}$ in the main attachment region SR), was 0.63, which is much smaller than the above frequencies. The liquid crystal display panel of the example 1 had higher display reliability. This is probably because that the component of the main sealing material did not leak from the main attachment region SR to the frame-shaped light-blocking region BR and did not penetrate into the display area AA.

The verification experiment 1 revealed that the cell gap in the dummy attachment region DR, which is located outwardly from the main attachment region SR, is preferably set to be large reduce display defects due to the intrusion phenomenon at the outer peripheral portion of the liquid crystal display panel 10.

However, in the liquid crystal display panel 10, if the distance between the CF-substrate side transparent substrate 21 and the array-substrate side transparent substrate 31 is largely partly varied, a display defect due to a non-uniform cell thickness would be caused. The display defect caused by the non-uniform cell thickness becomes more visible as the distance between the transparent substrates 21 and 31 becomes more uneven. The visibility of the display defect largely depends on the screen size of the liquid crystal display panel. Specifically described, the visibility increases as the screen size of the liquid crystal display panel decreases, because change in the cell thickness from the outer peripheral portion to the middle of the display area AA becomes sharper.

The inventors conducted various studies including the verification experiment 1 and found that, in the production of a liquid crystal display panel having a screen size of less than 5 inches, for example, the liquid crystal display panel body component including the liquid crystal display panel is preferably designed such that the cell gap $G_{DR}$ in the dummy attachment region DR is larger than 1.00 times and not more than 1.20 times of the cell gap $G_{SR}$ in the main attachment region SR, and is more preferably designed such that the cell gap $G_{DR}$ in the dummy attachment region DR is not less than 1.03 times and not more than 1.10 times of the cell gap $G_{SR}$ in the main attachment region SR. In particular, the inventors found that the liquid crystal display panel 10 separated from the above-designed liquid crystal display panel body component 10M in which the cell gap $G_{DR}$ is not less than 1.05 times and not more than 1.08 times of the cell gap $G_{SP}$ has high display quality.

Similarly, in the production of liquid crystal display panels having a screen size of not less than 5 inches and not more than 10 inches, the liquid crystal display panel body component is preferably designed such that the cell gap $G_{DR}$ is larger than 1.00 times and not more than 1.20 times of the cell gap $G_{SR}$, is more preferably designed such that the cell gap $G_{DP}$ is not less than 1.04 times and not more than 1.13 times of the cell gap $G_{SR}$, and is further more preferably designed such that the cell gap $G_{DR}$ is not less than 1.06 times and not more than 1.11 times of the cell gap $G_{SR}$.

Similarly, in the production of liquid crystal display panels having a screen size of more than 10 inches, the liquid crystal display panel body component is preferably designed such that the cell gap $G_{DR}$ is larger than 1.00 times and not more than 1.20 times of the cell gap $G_{SR}$, is more preferably designed such that the cell gap $G_{DR}$ is not less than 0.07 times and not more than 1.17 times of the cell gap $G_{SR}$, and is further more preferably designed such that the cell gap $G_{DP}$ is not less than 1.09 times and not more than 1.15 times of the cell gap $G_{SR}$.

Liquid crystal display panels having less visible display defects, which are caused by a non-uniform cell thickness, and less display defects, which are caused by the intrusion phenomenon, are obtained by adjusting the cell gap $G_{SR}$ the above-described ranges.

As described above, the liquid crystal display panel 10 according to the first embodiment includes the array substrate (second substrate) 30, the CF substrate (first substrate) 20 opposing the array substrate 30, the liquid crystal layer 40 between the array substrate 30 and the CF substrate 20, and the main sealing portion 50 that is disposed in a circular shape to surround the liquid crystal layer 40 and assembles the array substrate 30 and the CF substrate 20 together to seal the liquid crystal layer 40 between the substrates 20 and 30. The distance $D_{SR}$ between the opposing surfaces of the array substrate 30 and the CF substrate 20 in the main attachment region SR of the array substrate 30 and the CF substrate 20 where the main sealing portion 50 is disposed is smaller at an innermost peripheral portion than at the other portions.

In the configuration of the first embodiment, the distance between the substrates 20 and 30 in the main attachment region SR is smaller at the innermost peripheral portion than at the other portions ($D_{SRI}<D_{SRO}$). This probably reduces the possibility that the main sealing portion 50 will be affected by expansion or contraction of the liquid crystal layer 40.

For example, in the first embodiment, the opposing surfaces of the substrates 20 and 30 do not have a step provided by a component thereon over the main attachment region SR. In the above-described configuration, the distance $D_{SR}$ between the substrates 20 and 30 increases toward the outer peripheral portion of the main attachment region SR, and the plate surfaces are oriented toward the outer peripheral side in the main attachment region SR (the substrate distance increases toward the outer peripheral side). When the liquid crystal material located inwardly from the main attachment portion SR is expanded or contracted, the liquid crystal display panel 10 having the above-described configuration does allow the component of the main sealing material to get into the liquid crystal material on the inner side or does not allow the main sealing material to leak from the initial position the inner side, compared with liquid crystal display panels in which the plate surfaces of the substrates are parallel to each other or oriented toward the inner peripheral side (the distance increases toward the liquid crystal layer 40).

This reduces the intrusion phenomenon of the sealing material and enables production of the liquid crystal display panel 10 having less display defects at the outer peripheral portion of the liquid crystal display panel 10, i.e., less display defects in the display area AA near the frame-shaped region FR.

Furthermore, the liquid crystal display panel body component 10M according to the first embodiment includes rows of liquid crystal display panels 10 each including the array substrate 30 including the array-substrate side transparent substrate (second transparent substrate) 31, the CF substrate including the CF-substrate side transparent substrate (first transparent substrate) 21 and opposing the array substrate 30, and the main sealing portion 50 assembling the array substrate 30 and the CF substrate 20 together and sealing the liquid crystal layer 40 between the substrates 20 and 30. The liquid crystal display panel body component 10M includes the mother array substrate (second mother substrate) 30M including rows of the array substrates 30 and including the array-substrate side mother transparent substrate (second mother transparent substrate) 31M including rows of the array-substrate side transparent substrates 31, the mother CF substrate (first mother substrate) 20M including rows of CF substrates 20 and including the CF-substrate side mother transparent substrate (first mother transparent substrate) 21M including rows of CF-substrate side transparent substrates 21, the main sealing portions 50 each disposed in a circular shape and located between the mother array substrate 30M and the mother CF substrate 20M, and the dummy sealing portions 60 that are located between the main sealing portions 50 adjacent to each other and assemble the mother array substrate 30M and the mother CF substrate 20M together. The distance between the plate surfaces of the array-substrate side mother transparent substrate 31M and the CF-substrate side mother transparent substrate 21M in the dummy attachment region DR of the mother substrates 20M and 30M where the dummy sealing portions 60 are disposed is larger than that in the main attachment region SR where the main sealing portions 50 are disposed.

In the configuration according to the first embodiment, the cell gap, which is the distance between t mother transparent substrates 21M and 31M, is larger the dummy attachment region DR, which is located outwardly from the main attachment region SR, than that the main attachment region SR ($G_{SR}<G_{DR}$). Thus, the main attachment region SR, the plate surfaces of the transparent substrates 21 and 31 are not parallel to each other and oriented toward the outer peripheral side (distance between the substrates increases toward the outer peripheral side). The liquid crystal display panel body component 10M having the above-described configuration is readily formed by adjusting the thickness of the dummy sealing portion 60 according to the cross-sectional configuration of the main attachment region SR and the dummy attachment region DR. The liquid crystal display panel body component 10M is separated into the liquid crystal display panels 10 having the above-described configuration.

In the liquid crystal display panel body component 10M according to the first embodiment, the distance between the plate surfaces of the array-substrate side mother transparent substrate 31M and the CF-substrate side mother transparent substrate 21M in the dummy attachment region DR may be larger than 1.00 times and not more than 1.20 times of that in the main attachment region SR.

The configuration according to first embodiment provides a high display-quality liquid crystal display panel not having display defects caused by a non-uniform cell thickness and having less display defects caused by the intrusion phenomenon at the outer peripheral portion.

In the liquid crystal display panel body component 10M according to the first embodiment, the dummy sealing portion 60 may be directly fixed to the array-substrate side mother transparent substrate 31M and the CF-substrate side mother transparent substrate 21M.

For example, in the liquid crystal display panel described in Patent Document 1 above, a light-blocking layer, which is a function layer, is also disposed below the dummy sealing portion. In such a liquid crystal display panel body component in which a structure, such as a light-blocking layer or a wiring layer, is disposed in the dummy area including the dummy attachment region, which is removed after separation of liquid crystal display panels, a rubbing process for adjusting the orientation of the liquid crystal material in the display area may cause a defect. Specifically described, in rubbing process of rubbing an alignment film on the substrate with a rolled cotton cloth or a rolled rayon cloth to make the anisotropy to control initial orientation of a liquid crystal material sandwiched between the array substrate and the CF substrate, the structure in the dummy attachment region may change a weave (orientation or angle of cloth). This leads to an unwanted orientation direction and causes a critical defect such as a transfer defect to the display area. In addition, scrapings from the alignment film or scrapings from the cloth generated by the rubbing process may gather at a stepped portion formed by the structure. This makes the height of the dummy sealing portion in the dummy attachment region unstable, and thus it is difficult to adjust the cell gap with high accuracy. Furthermore, in a liquid crystal display panel including a photo-alignment film material, a polarizing direction in a photo-alignment process may be affected by reflection from the structure, and thus the desired orientation not obtained in some cases.

In the configuration according to the first embodiment, the dummy sealing portion 60 is directly fixed to the mother transparent substrates 21M and 31M, and no structure but the dummy sealing portion 60 is disposed between the array-substrate side mother transparent substrate 31M and the CF-substrate side mother transparent substrate 21M in the dummy attachment region DR. Thus, a defect is unlikely to be caused by the rubbing process or the photo-alignment process. The configuration enables production of a various types of liquid crystal display panel body components 10M, such as one requiring adjustment of the orientation of the liquid crystal material.

In the liquid crystal display panel body component 10M according to the first embodiment, the dummy sealing portion 60 includes the dummy spacer 61 that defines the thickness of the dummy sealing portion 60. The thickness of the dummy sealing portion 60 may be larger than the distance between the plate surfaces of the array-substrate side mother transparent substrate 31M and the CF-substrate side mother substrate 21M in the main attachment region SR.

In the configuration according to the first embodiment, the thickness of the dummy sealing portion 60 relative to the distance between the plate surfaces of the array-substrate side mother transparent substrate 31M and the CF-substrate side mother transparent substrate 21M in the main attachment region SR is readily set in a predetermined range by suitably determining the dimension (for example, øD) of the dummy spacer 61. In the first embodiment, the main sealing portion 50 also includes the main spacer 51 that defines the thickness of the main sealing portion 50. The thickness of the main sealing portion 50 is readily set by suitably determining the dimension (for example, øS) of the main spacer 51.

The method of producing the liquid crystal display panel 10 according to the first embodiment includes the main sealing material application process of applying the main sealing material to be the main sealing portion 50 in a circular shape to multiple positions on the mother CF substrate 20M, the dummy sealing material application process of applying the dummy sealing material to be the dummy sealing portion 60 to positions between the positions of the main sealing material adjacent to each other on the mother CF substrate 20M, the sealing portion formation process of curing main sealing material and the dummy sealing material on the mother CF substrate 20M disposed opposite to the mother array substrate 30M to form the main sealing portions 50 and the dummy sealing portions 60 and assembling the mother array substrate 30M and the mother CF substrate 20M together such that the liquid crystal display panel body component 10M described above is produced, and the liquid crystal display panel separation process of separating the liquid crystal display panel body component 10M into the liquid crystal display panels 10.

The liquid crystal display panel body component 10M having the above-described configuration is readily produced by the method according to the first embodiment. In the above-described method, the main sealing material application process may be performed before or after the dummy sealing material application process. Furthermore, the liquid crystal material may be applied to the area surrounded by the main sealing material before the sealing portion formation process. Alternatively, the main sealing material may be applied in the main sealing material application process such that a liquid crystal material inlet is provided, and then a liquid crystal material may be applied through the inlet after the sealing portion formation process.

In the method of producing the liquid crystal display panel 10 according to the first embodiment, the mother array substrate 30M and the mother CF substrate 20M may be assembled together by pressure in the sealing portion formation process.

In the production of the liquid crystal display panel body component, the first mother substrate and the second mother substrate facing each other are generally assembled together by pressure assembling, for example, vacuum pressure assembling. In such a production method, the main sealing portion 50 and the dummy sealing portion 60 each having a predetermined height are provided and the arrangement density of the frame-shaped region spacers 25B is adjusted to control the withstand load in the frame-shaped region FR, and thus the liquid crystal display panel body component 10M having a desired configuration is readily produced.

Second Embodiment

A second embodiment is described with reference to FIG. 8 to FIG. 10.

In a liquid crystal display panel 210 according to the second embodiment, an arrangement density of frame-shaped region spacers 225B differs from that in the liquid crystal display panel 10 according to the first embodiment. In this configuration, the cell gap $G_{BR}$ (distance between plate surfaces of a CF-substrate side transparent substrate 221 and an array-substrate side transparent substrate 31) in the frame-shaped light-blocking region BR is smaller than the cell gap $G_{SR}$ in the main attachment region SR. Hereinafter, components identical to those in the first embodiment are assigned the same reference numerals as those in the first embodiment and the structure, the operation, and the effect thereof are not described.

Figure 8:
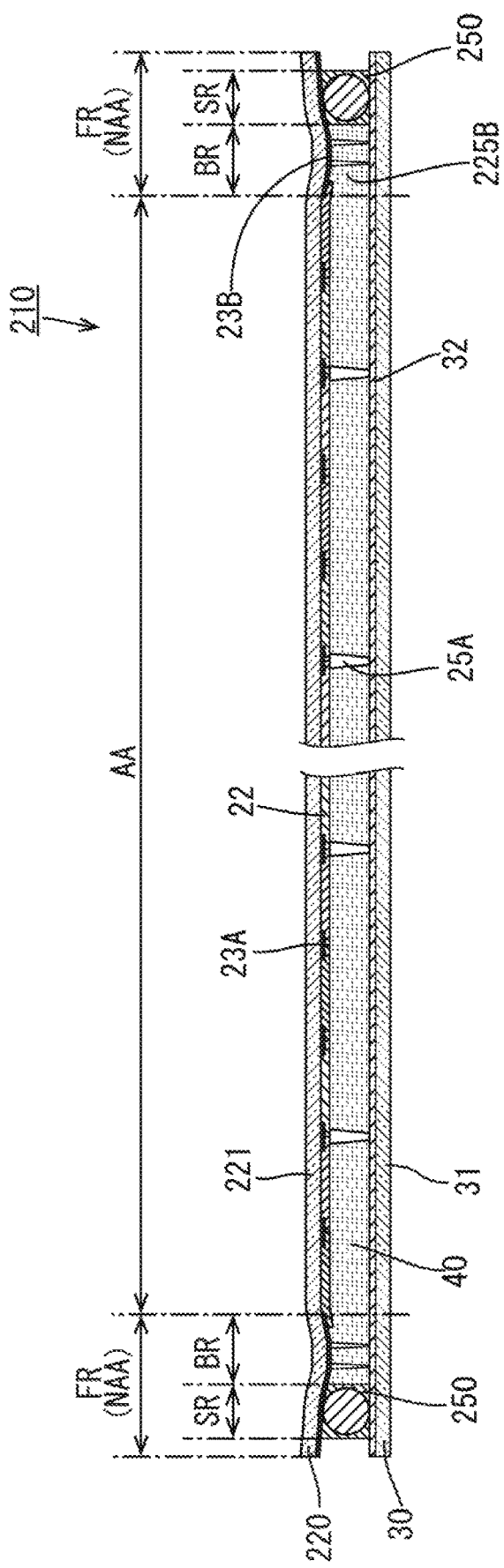
FIG. 8 is a schematic view illustrating an outline of a cross-sectional configuration of a liquid crystal display panel according to a second embodiment.

FIG. 8 is a schematic view illustrating an outline of a cross-sectional configuration of the liquid crystal display panel 210. As illustrated in FIG. 8, in the liquid crystal display panel 210 according to the second embodiment, the cell gap $G_{BR}$ in the frame-shaped light-blocking region BR is smaller than the cell gap $G_{SR}$ in the main attachment region SR after the pressure assembling. The structure of a portion of the liquid crystal display panel 210 including the frame-shaped region FR and the design for obtaining such a structure are described below with reference to FIG. 9, which illustrates a cross-sectional configuration of the liquid crystal display panel body component 210M.

Figure 9:
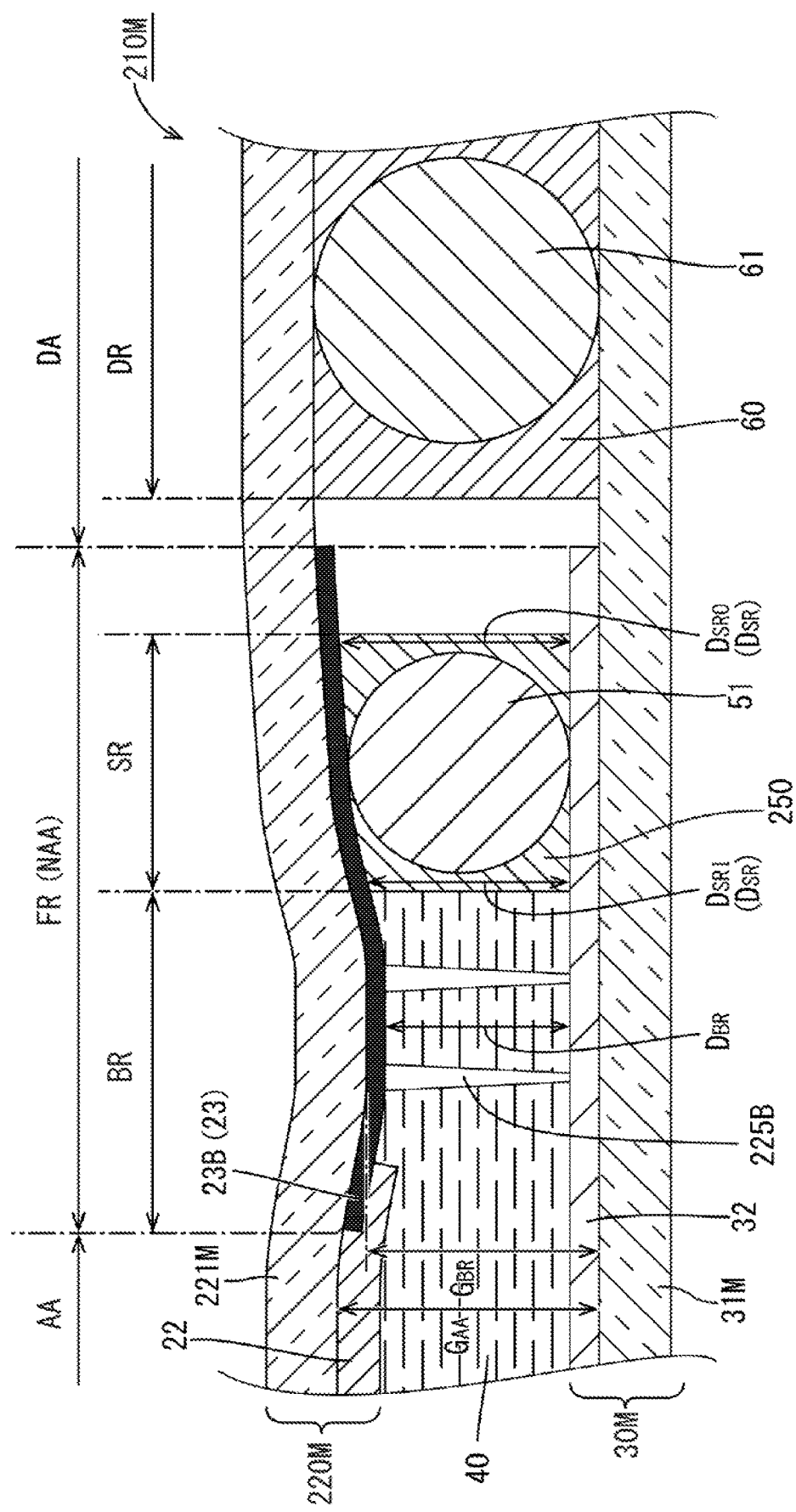
FIG. 9 is a schematic view illustrating an outline of a cross-sectional configuration of a portion of the liquid crystal display panel body component including the main attachment region.

FIG. 9 is a magnified view illustrating a portion of the liquid crystal display panel body component 210M including the main attachment region SR. As illustrated in FIG. 9, the arrangement density of the frame-shaped region spacers 225B in the liquid crystal display panel body component 210M according to the second embodiment is lower than that of the frame-shaped region spacers 25B in the liquid crystal display panel body component 10M according to the first embodiment, which is illustrated in FIG. 5. In this configuration, even when the frame-shaped region spacers 225B and the display area spacers 25A having the same protruded length are formed simultaneously by photolithography, for example, during the production of the liquid crystal display panel body component 210M, the frame-shaped region spacers 225B are partly compressed by pressure applied during pressure assembling of the mother substrates 220M and 30M. Thus, the distance between the mother substrates 220M and 30M in the frame-shaped light-blocking region BR is designed so as to be smaller than that in the display area AA. For example, the shape of the frame-shaped region spacer 225B may be the same as that of the frame-shaped region spacer 25B in the first embodiment. In such a case, the arrangement density of the frame-shaped region spacers 225B may be set such that the area of the bottoms thereof occupy 0.20% or more and less than 2.00% of the area of the frame-shaped light-blocking region BR, which is about 30% to about 90% smaller than the arrangement density of the frame-shaped region spacers 25B in the first embodiment. The arrangement density of the frame-shaped region spacers 225B is preferably set to 0.50% or more and less than 1.90% of the area of the frame-shaped light-blocking region BR, more preferably 1.00% or more and less than 1.80%. If the arrangement density is larger than the above-described ranges, the frame-shaped region spacers 225B would not be compressed in the production process and the effects described below cannot be obtained. In contrast, if the arrangement density is smaller than the above-described ranges, the alignment film, for example, on the innermost surface of the array substrate 30 would be rubbed away by the protruded end of the frame-shaped region spacer 225B in the frame-shaped light-blocking region BR due to vibration of the liquid crystal display panel in use, for example. The rubbed-off scraping may come in the display area AA and cause a display defect.

In the production of the liquid crystal display panel body component 210M, as in the production of the liquid crystal display panel body component 10M according to the first embodiment, the mother CF substrate 220M including the frame-shaped region spacers 225B at the above-described lower arrangement density is assembled to the mother array substrate 30M by pressure in the sealing portion formation process. This allows a cell gap $G_{AA}$ (distance between the mother transparent substrates 221M and 31M) in the display area AA to be kept at a constant distance by the display area spacers 25A and decreases the cell gap $G_{BR}$ in the frame-shaped light-blocking region BR ($G_{AA}$>$G_{BR}$), because some of the frame-shaped region spacers 225B are compressed and the distance $D_{BR}$ between the mother substrates 220M and 30M decreases. Furthermore, the outer peripheral portion of the frame-shaped region FR including the main attachment region SR is expanded by the dummy sealing portion 60, as in the liquid crystal display panel body component 10M according to the first embodiment. Thus, in the liquid crystal display panel body component 210M according to the second embodiment, leverage larger than that in the liquid crystal display panel body component 10M according to the first embodiment acts in the main attachment region SR. This makes the distance $D_{SRI}$ between the mother substrates 220M and 30M at the innermost peripheral portion much smaller than the distance $D_{SRO}$ thereof at the outer peripheral portion ($D_{SRI}$<$D_{SRO}$).

In such a state, the main sealing portion 250 and the dummy sealing portion 60 are formed by curing. As a result, the liquid crystal display panel body component 210M including the mother substrates 220M and 30M fixed together with the substrate distance $D_{SP}$ at the inner peripheral portion of the main attachment region SR and that at the outer peripheral portion of the main attachment region SR being greatly different is produced. The dummy area DA is removed from the liquid crystal display panel body component 210M to obtain a liquid crystal display panel 210 according to the second embodiment.

Verification Experiment

A verification experiment 2 was conducted to examine how the display reliability of the liquid crystal display panel is affected by the arrangement density of the frame-shaped region spacers.

In the verification experiment 2, a liquid crystal display panel having a cell thickness of 3 µm, which is suitable for a 10.21 in-vehicle monitor, was used as a sample as in the verification experiment 1. The samples of an example 1 and comparative examples 1 and 2 were the same as those in the verification experiment 1. The arrangement density of the frame-shaped region spacers (proportion of the total area of the bottoms of the frame-shaped region spacers to the area of the frame-shaped light-blocking region BR) the example 1 and the comparative examples 1 and 2 was 2.66%. Furthermore, a liquid crystal display panel separated from a liquid crystal display panel body component having the same configuration as the example 1 except that the arrangement density of the frame-shaped region spacers was changed to 1.78% was used as a sample of an example 2.

In the verification experiment 2, the same thermal shock cycle test as that in the verification experiment 1 was performed. The frequencies of display defects at the outer peripheral portions of the display areas AA after 300 cycles were compared.

Figure 10:
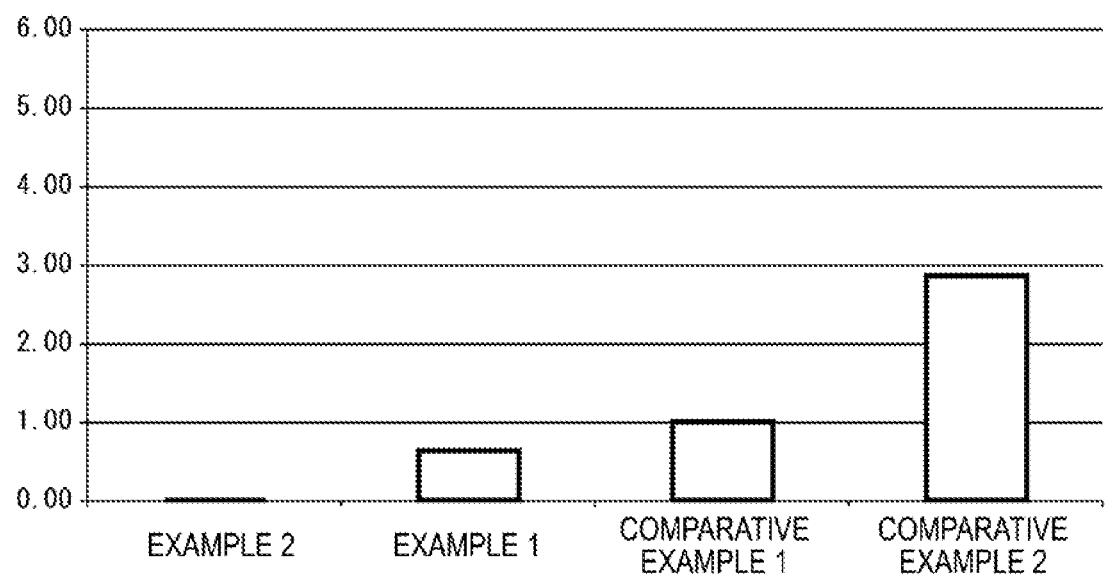
FIG. 10 is a graph indicating frequencies (relative value) of display defects observed at an outer peripheral portion of each of liquid crystal display panels.

FIG. 10 is a graph illustrating results of the verification experiment 2. As indicated in FIG. 10, a display defect was not detected in the liquid crystal display panel of the example 2, which was separated from the liquid crystal display panel body component in which the arrangement density of the frame-shaped region spacers 225B was reduced such that the cell gap $G_{BR}$ in the frame-shaped light-blocking region BR becomes smaller than the cell gap $G_{AA}$ in the display area AA. This confirmed that the liquid crystal display panel of the example 2 was provided with higher display reliability than the liquid crystal display panel of the example 1. This is probably because that leakage of the component of the main sealing material from the main attachment region SR to the frame-shaped light-blocking region BR and the display area AA was largely reduced due to a greater decrease in the distance $D_{SPI}$ between the substrates at the innermost peripheral portion of the main attachment region SR.

As described above, in the liquid crystal display panel 210 according to the second embodiment, the frame-shaped light-blocking layer 23B, which blocks light, is disposed in the CF substrate 220 at least over the frame-shaped light-blocking region BR adjacent to the inner periphery of the main attachment region SR. The distance between the opposing surfaces of the array substrate 30 and the CF substrate 220 in the frame-shaped light-blocking region BR is smaller than that in the main attachment region SR.

In the configuration of the second embodiment, the distance between the substrates in the frame-shaped light-blocking region BR adjacent to the inner periphery of the main attachment region SR is smaller than that in the main attachment region SR ($D_{BP}$<$D_{SR}$). Thus, the main sealing portion 250 is less likely to be affected by expansion or contraction of the liquid crystal layer 40. The intrusion phenomenon in which the sealing material component of the main sealing portion 250 leaks to the liquid crystal layer 40 is further effectively suppressed.

In the second embodiment, the opposing surfaces of the substrates 220 and 30 have no steps in the frame-shaped light-blocking region BR and the main attachment region SR. In this case, the plate surfaces are oriented more toward the outer peripheral side (side away from the liquid crystal layer 40) particularly in the area including the innermost peripheral portion of the main attachment region SR and the outermost peripheral portion of the frame-shaped light-blocking region BR. In the liquid crystal display panel 210 having such a configuration, liquid crystal material located inwardly from the main attachment region SR does not flow across the border with the main attachment region SR when the liquid crystal material is expanded or contracted, compared with the liquid crystal material in a liquid crystal display panel in which the plate surfaces are parallel to each other or oriented toward the inner peripheral side (distance between the plate surfaces increases toward the liquid crystal layer 40).

This results a further reduction in display defects in the display area AA near the frame-shaped region FR.

Furthermore, in the liquid crystal display panel body component 210M according to the second embodiment, the frame-shaped light-blocking layer (light-blocking layer) 23B, which blocks light, is disposed on an inner surface (the array substrate side or second substrate side) of the CF-substrate side transparent substrate (first transparent substrate) 221 at least over the frame-shaped light-blocking region BR adjacent to the inner periphery of the main attachment region SR, and the distance between the plate surfaces of the CF-substrate side transparent substrate 221 and the array-substrate side transparent substrate (second transparent substrate) 31 in the frame-shaped light-blocking region BR is smaller than that in the main attachment region SR.

In the configuration of the second embodiment, the cell gap in the frame-shaped light-blocking region BR adjacent to the inner periphery of the main attachment region SR is smaller than that in the main attachment region SR ($G_{BR}<G_{SR}$). Thus, in the liquid crystal display panels 210 included in the liquid crystal display panel body component 210M, the transparent substrates 221 and 31 are arranged such that the plate surfaces are largely oriented toward the outer peripheral side of the main attachment region SR (outer peripheral side of the liquid crystal display panels 210, side away from the liquid crystal layer 40) over an area including the outermost peripheral portion of the frame-shaped region FR and the innermost peripheral portion of the main attachment region SR. The liquid crystal display panel body component 210M having such a configuration is separated into the liquid crystal display panels 210 having the above-described advantages.

The liquid crystal display panel body component 210M according to the second embodiment further includes the frame-shaped region spacers (one kind of protruded spacer 25) 225B in the frame-shaped light-blocking region BR. The frame-shaped region spacers 225B protrude from one of opposing surfaces of the array substrate 30 and the CF substrate 220 to the other of the opposing surfaces of the substrates 30 and 220 to define a distance between the opposing surfaces of the substrates. The protruded spacers 225B occupy less than 2% of the area of the frame-shaped light-blocking region BR in the total area of the bottoms thereof on the CF substrate 220 or in the total area of the heads thereof in contact with the array substrate 30, whichever is larger (in the total area of the bottoms in the second embodiment).

Typically, the frame-shaped region spacers 225B in the frame-shaped light-blocking region BR are formed by photolithography together with the display-area spacers 25A in the display area AA, and thus it is difficult to form the frame-shaped region spacers 225B and the display-area spacers 25A in different heights.

In the configuration of the second embodiment, the arrangement density of the frame-shaped region spacers 225B in the frame-shaped light-blocking region BR is adjusted such that the frame-shaped region spacers 225B are moderately compressed when the mother CF substrate 220M and the mother array substrate 30M are assembled together. This enables the liquid crystal display panel body component 210M having a small distance between the substrates in the frame-shaped light-blocking region BR to be produced without complex processes.

Other Embodiments

The present technology is not limited to the embodiments described above and with reference to the drawings. The following embodiments may be included in the technical scope.

(1) In the above-described embodiment, the main sealing material is applied such that an opening as an inlet is provided, and a liquid crystal material is applied to an area surrounded by the main sealing portion (vacuum injection process) after the sealing portion formation process (i.e., after the main sealing portion is formed to assemble the mother substrates together). However, the present technology is not limited to this example. For example, the main sealing material may be applied in an endless circular shape on the first mother substrate, and the liquid crystal material may be applied to the area surrounded by the main sealing material (one drop fill process) before the sealing portion formation process (i.e., before the first mother substrate and the second mother substrate are assembled together).

(2) In the liquid crystal display panel of the above-described embodiment, the dummy sealing material in the areas between the adjacent main attachment regions SR is equally spaced apart from the main attachment regions SR. However, the present technology is not limited thereto. For example, in the dummy area DA between the main attachment region SR adjacent to the substrate non-overlapping area NOA of one of the liquid crystal display panels and the main attachment region SR on a side opposite the substrate non-overlapping area NOA of another of the liquid crystal display panels, the dummy sealing material is preferably located farther from the main attachment region SR adjacent to the substrate non-overlapping area NOA.

Furthermore, in the liquid crystal display panel of the above-described embodiment, the dummy sealing material is applied in a straight line between the main attachment regions SR adjacent to each other. However, the present technology is not limited thereto. For example, when the distance between the main attachment regions SR adjacent to each other is large, the dummy sealing portions in two or more straight lines may be disposed between the main attachment regions SR.

Furthermore, in the liquid crystal display panel of the above-described embodiment, the dummy sealing material is applied at an interval in a straight line. However, the present technology is not limited thereto. For example, the dummy attachment regions DR may be disposed in an L-like shape at the corners of the mother CF substrate or may be disposed in a cross-like shape or in a dot pattern in a dummy area DA surrounded by the corners of the four liquid crystal display panels. Alternatively, the dummy attachment region DR may extend in a circular shape as the main attachment region SR.

(3) In the liquid crystal display panel of the above-described embodiment, the display area AA has a rectangular shape. However, the present technology is not limited thereto. The present technology is applicable to liquid crystal display panels having a display area AA having any planar shape, such as a circular, elliptical, semi-circular, polygonal, or indefinite planar shape. Furthermore, in the above-described embodiments, the liquid crystal display panel having a flat overall shape is described. However, the present technology is not limited thereto. The present technology is applicable to a liquid crystal display panel having a curved overall shape.

(4) In the liquid crystal display panel body component of the above-described embodiment, the main sealing portion and the dummy sealing portion include fiber spacers or granular spacers to define the thickness of the sealing portions. However, the present technology is not limited thereto. For example, the spacers may be eliminated, and the thicknesses of the sealing portions may be controlled by adjusting the thicknesses of the sealing material and the pressure for assembling the mother substrates. Alternatively, protruded spacers may be disposed in one or both of the main attachment region SR and the dummy attachment region DR. When protruded dummy spacers are disposed in the dummy attachment region DR of a liquid crystal display panel that is required to be subjected to a rubbing process, the shape and the arrangement density of the dummy spacers are preferably similar to those of the protruded spacers in the display area AA, such that the protruded dummy spacers do not affect the initial orientation of the liquid crystal material or do not make the height of the dummy sealing portion unstable in the rubbing process.

(5) In the liquid crystal display panel of the above-described embodiment, the light-blocking film and the wiring layer are disposed in the main attachment region SR. However, the present technology is not limited thereto. The light-blocking film and the wiring layer may be eliminated from the main attachment region SR or components other than the light-blocking film and the wiring layer may be disposed in the main attachment region SR.

(6) The configuration of the liquid crystal display panel in the display area AA is not limited. A black and white filter may be disposed instead of the color filter. The distance between the substrates may be controlled by fiber or granular spacers, instead of the protruded spacers. The spacers may be eliminated from the display area AA.

Furthermore, an operation mode of the liquid crystal display panel is not limited. The present technology is applicable to liquid crystal display panels operated in a vertical electrical field mode, such as a vertical alignment (VA) mode or a twisted sematic (TN) mode, in which an electrical field is applied in a direction perpendicular the plate surfaces of the substrates (vertical direction), a horizontal electric field mode, such as a fringe field switching (FES) mode and an in-plane switching (IPS) mode, and other modes.

EXPLANATION OF SYMBOLS 10, 210: liquid crystal display panel
10M, 210M, 910M: liquid crystal display panel body component
20, 220: CF substrate (first substrate)
20M, 220M: mother CF substrate (first mother substrate)
21, 221: CF-substrate side transparent substrate (first transparent substrate)
21M, 221M: CF-substrate side mother transparent substrate (first mother transparent substrate)
22: color filter
23A: inter-pixel light-blocking layer
23B: frame-shaped light-blocking layer (light-blocking layer)
25: protruded spacer
25A: display area spacer
25B, 225B: frame-shaped region spacer (protruded spacer)
30: array substrate (second substrate)
30M: mother array substrate (second mother substrate)
31: array-substrate side transparent substrate (second transparent substrate)
31M: array-substrate side mother transparent substrate (second mother transparent substrate)
32: wiring layer
40: liquid crystal layer
50, 250: main sealing portion
51: main spacer
60, 960: dummy sealing portion
61, 961: dummy spacer
AA: display area
NAA: non-display area
NOA: substrate non-overlapping area
DA: dummy area
FR: frame-shaped region
BR: frame-shaped light-blocking region
SR: main attachment region
DR: dummy attachment region
CL: cutting line
$D_{BR}$: distance between substrates (distance between opposing surfaces) in the frame-shaped light-blocking region
$D_{SR}$: distance between substrates in the main attachment region
$D_{SRI}$: distance between substrates at the innermost peripheral portion of the main attachment region
$D_{SPO}$: distance between substrates at the outer peripheral portion of the main attachment region
$G_{AA}$: cell gap in the display area
$G_{BR}$: cell gap in the frame-shaped light-blocking region
$G_{DR}$: cell gap in the dummy attachment region
$G_{SR}$: cell gap in the main attachment region
$G_{SRO}$: cell gap at the outermost peripheral portion in the main attachment region
$L_{23}$: thickness of the light-blocking layer
$L_{32}$: thickness of the wiring layer
øD, øD': diameter of the dummy spacer
øS: dimeter of the main spacer

The invention claimed is:

1. A liquid crystal display panel body component including rows of liquid crystal display panels each including a first substrate including a first transparent substrate, a second substrate including a second transparent substrate and opposing the first substrate, and a main sealing portion assembling the first substrate and the second substrate together and sealing a liquid crystal layer between the first and second substrates, the liquid crystal display panel body component comprising:

a first mother substrate including rows of first substrates and including a first mother transparent substrate including rows of first transparent substrates, a thickness of the first transparent substrate being constant;

a second mother substrate including rows of second substrates and including a second mother transparent substrate including rows of second transparent substrates, a thickness of the second transparent substrate being constant;

a plurality of main sealing portions each disposed in a circular shape and located between the first mother substrates and the second mother substrates; and a dummy sealing portion that is located between the plurality of main sealing portions adjacent to each other and assembles the first mother substrate and the second mother substrate together, wherein a distance between plate surfaces of the first mother transparent substrate and the second mother transparent substrate in a dummy attachment region of the mother substrates where the dummy sealing portions are disposed is larger than that in a main attachment region where the main sealing portions are disposed, the main sealing portion includes a main spacer defining a thickness of the main sealing portion, the dummy sealing portion includes a dummy spacer defining a thickness of the dummy sealing portion, a dimension of the dummy spacer in a thickness direction is greater than that of the main spacer, and the thickness direction is a direction normal to the plate surface of the first mother transparent substrate, and a distance between the main attachment region and the dummy attachment region is 2.7 mm or more and less than 6.5 mm.

2. The liquid crystal display panel body component according to claim 1, wherein the distance between the plate surfaces of the first mother transparent substrate and the second mother transparent substrate in the dummy attachment region is larger than 1.00 times and not more than 1.20 times of distance thereof in the main attachment region.

3. The liquid crystal display panel body component according to claim 1, wherein a light-blocking layer that blocks light is disposed on a surface of the second substrate side of each of the first transparent substrates at least over a frame-shaped light-blocking region adjacent to an inner periphery of the main attachment region, and a distance between plate surfaces of the first transparent substrates and the second transparent substrates in the frame-shaped light-blocking region is smaller than that in the main attachment region.

4. The liquid crystal display panel body component according to claim 3, further comprising a protruded spacer in the frame-shaped light-blocking region, the protruded spacer protruding from one of opposing surfaces of the first substrate and the second substrate to the other of the opposing surfaces of the first and second substrates to define a distance between the opposing surfaces of the substrates, wherein the protruded spacer occupies less than 2% of an area of the frame-shaped light-blocking region in an area of a bottom thereof on one of the first and second substrates or in an area of a head thereof in contact with the other of the first and second substrates, whichever is larger.

5. The liquid crystal display panel body component according to claim 1, wherein the dummy sealing portion is directly fixed to the first mother transparent substrate and the second mother transparent substrate.

6. The liquid crystal display panel body component according to claim 5, wherein the dummy sealing portion includes a dummy spacer defining a thickness of the dummy sealing portion, and the thickness of the dummy sealing portion is larger than the distance between the plate surfaces of the first mother transparent substrate and the second mother transparent substrate in the main attachment region.

7. The liquid crystal display panel body component according to claim 1, wherein:

a light-blocking layer that blocks light is disposed on a surface of the second substrate side of each of the first transparent substrates at least over a frame-shaped light-blocking region adjacent to an inner periphery of the main attachment region, a display area is located on an inner side of the frame-shaped light-blocking region, and a distance between opposing surfaces of the first substrate and the second substrate in the frame-shaped light-blocking region is greater than that in the display area.

* * * * *